(12) United States Patent
Altero-Marquez et al.

(10) Patent No.: US 10,865,572 B2
(45) Date of Patent: Dec. 15, 2020

(54) HOLE PROTECTOR DEVICE FOR MECHANICAL, PLUMBING, AND ELECTRICAL (MPE) SYSTEMS

(71) Applicant: Dima Building Innovators LLC, Laveen, AZ (US)

(72) Inventors: Manuel Altero-Marquez, Chandler, AZ (US); David Cruz, Laveen Village, AZ (US); Issael Altero-Marquez, Chandler, AZ (US); Andres Sandoval, Queen Creek, AZ (US); Aaron Watson, Tempe, AZ (US)

(73) Assignee: Dima Building Innovators LLC, Laveen, AZ (US)

( * ) Notice: Subject to any disclaimer, the term of this patent is extended or adjusted under 35 U.S.C. 154(b) by 0 days.

(21) Appl. No.: 16/428,391

(22) Filed: May 31, 2019

(65) Prior Publication Data

US 2019/0368206 A1 Dec. 5, 2019

Related U.S. Application Data

(60) Provisional application No. 62/679,018, filed on May 31, 2018.

(51) Int. Cl.
*F16L 5/00* (2006.01)
*E04F 19/08* (2006.01)
*E04G 21/32* (2006.01)

(52) U.S. Cl.
CPC .......... *E04F 19/08* (2013.01); *E04G 21/3252* (2013.01); *F16L 5/00* (2013.01); *E04F 2290/02* (2013.01)

(58) Field of Classification Search
CPC .......... F16L 5/04; F16L 5/00; E04F 2290/02; H02G 3/14; E04G 21/32
See application file for complete search history.

(56) References Cited

U.S. PATENT DOCUMENTS

| | | | | |
|---|---|---|---|---|
| 3,811,004 A * | 5/1974 | Moore | .................... | H01R 13/60 174/67 |
| 6,854,226 B2 * | 2/2005 | Cole | ...................... | H02G 3/185 174/64 |
| 7,053,296 B2 * | 5/2006 | Drane | .................. | H02G 3/0493 174/483 |
| 7,078,616 B2 * | 7/2006 | Roesch | .................. | H02G 3/185 174/482 |
| 8,921,695 B2 * | 12/2014 | Drane | .................... | H02G 3/185 174/66 |
| 9,089,726 B1 * | 7/2015 | Luo | ........................ | A62C 2/065 |
| 9,831,648 B1 * | 11/2017 | Gretz | ..................... | H02G 3/081 |
| 10,530,140 B2 * | 1/2020 | Drane | .................... | H02G 3/088 |
| 2003/0009961 A1 * | 1/2003 | Radke | ................... | E04G 15/061 52/220.1 |

(Continued)

*Primary Examiner* — Gisele D Ford
(74) *Attorney, Agent, or Firm* — Brian M. Kaufman; Robert D. Atkins; Patent Law Group: Atkins and Associates, P.C.

(57) ABSTRACT

A building is constructed by providing a subfloor and forming a hole in the subfloor. A hole protector includes a cylinder, a skirt disposed around the cylinder, and a cap disposed on the cylinder. The hole protector is disposed over the hole with the cylinder extending into the hole. The hole protector is fastened to the subfloor. The cap is removed from the hole protector. An MPE is disposed through the cylinder.

20 Claims, 21 Drawing Sheets

(56) References Cited

U.S. PATENT DOCUMENTS

| | | | |
|---|---|---|---|
| 2004/0016190 A1* | 1/2004 | Radke | E04G 15/061 52/232 |
| 2004/0016191 A1* | 1/2004 | Whitty | F16L 5/04 52/232 |
| 2006/0102369 A1* | 5/2006 | Milani | E04B 5/48 174/481 |
| 2007/0014102 A1* | 1/2007 | Drane | H02G 3/185 362/153 |
| 2008/0011503 A1* | 1/2008 | Dinh | H02G 3/14 174/53 |
| 2008/0256880 A1* | 10/2008 | Nurenberg | H02G 3/088 52/198 |
| 2009/0218130 A1* | 9/2009 | Monden | H02G 3/22 174/505 |
| 2010/0243294 A1* | 9/2010 | Ayme | H02G 3/22 174/153 R |
| 2012/0012347 A1* | 1/2012 | Zernach | A62C 2/065 169/48 |
| 2012/0233943 A1* | 9/2012 | Monden | F16L 5/04 52/220.1 |
| 2014/0190105 A1* | 7/2014 | Babson | E04B 1/26 52/309.1 |
| 2014/0262420 A1* | 9/2014 | Scanzillo | H02G 3/14 174/67 |
| 2015/0121782 A1* | 5/2015 | McConnell | H02G 3/22 52/232 |
| 2016/0072266 A1* | 3/2016 | Bulancea | H02G 3/088 174/67 |
| 2016/0341341 A1* | 11/2016 | Lin | F16L 5/04 |

\* cited by examiner

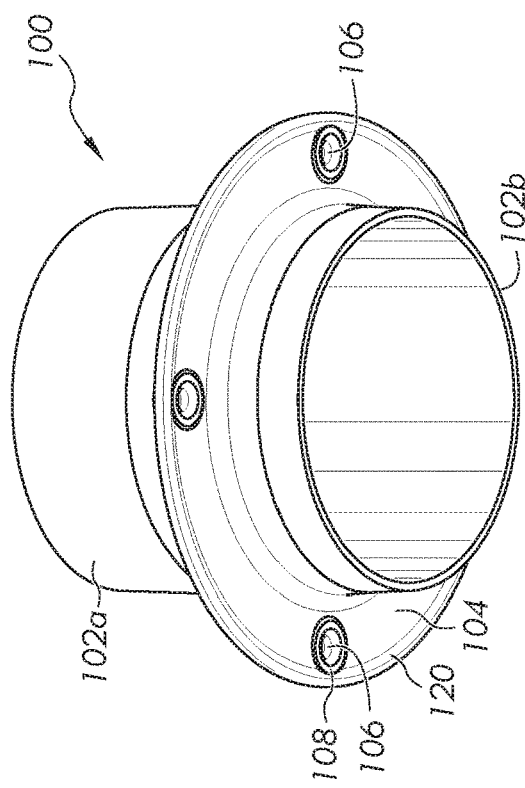
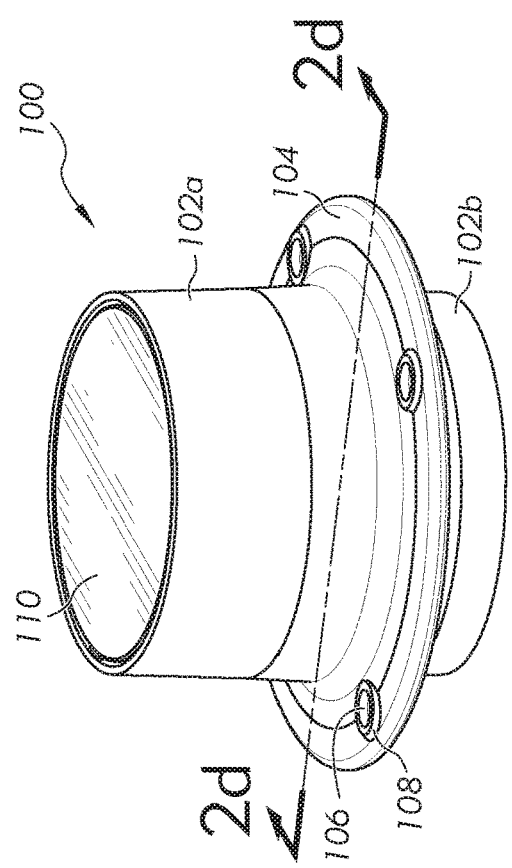
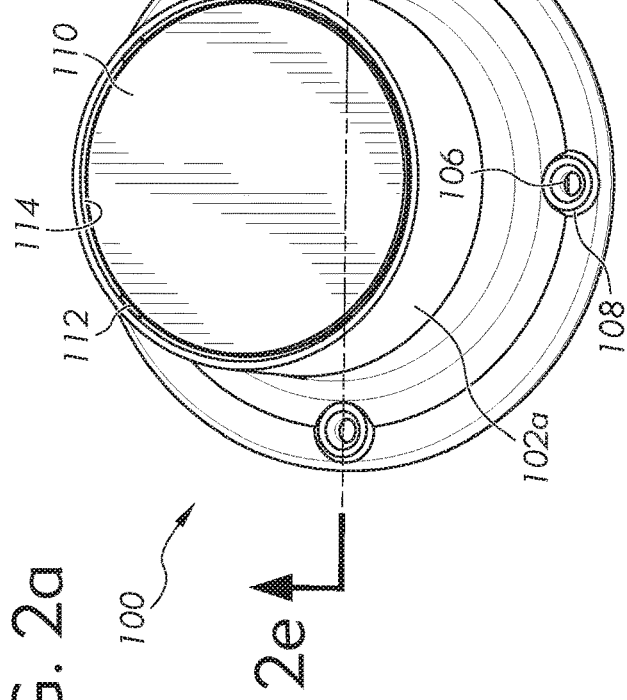

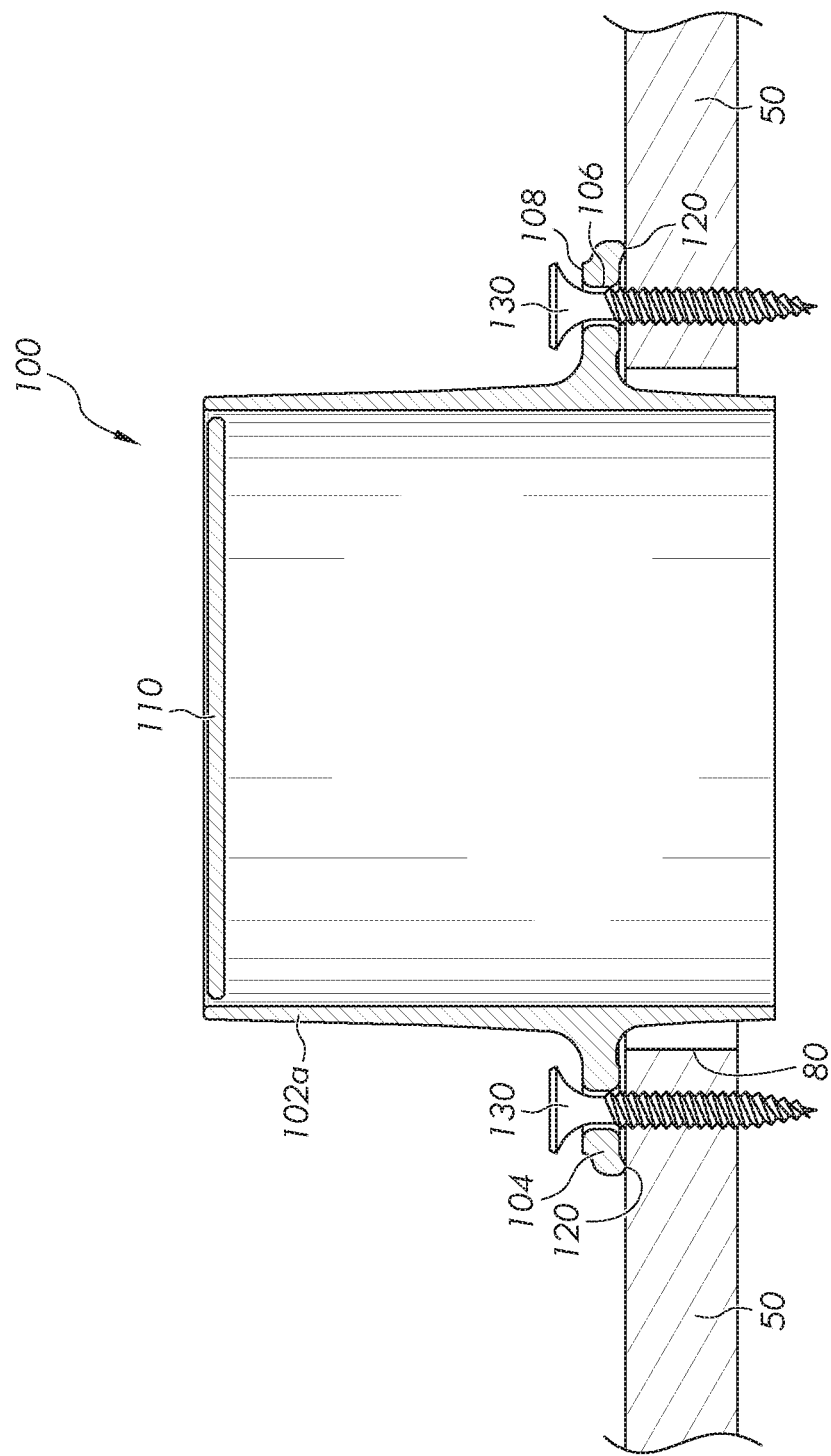

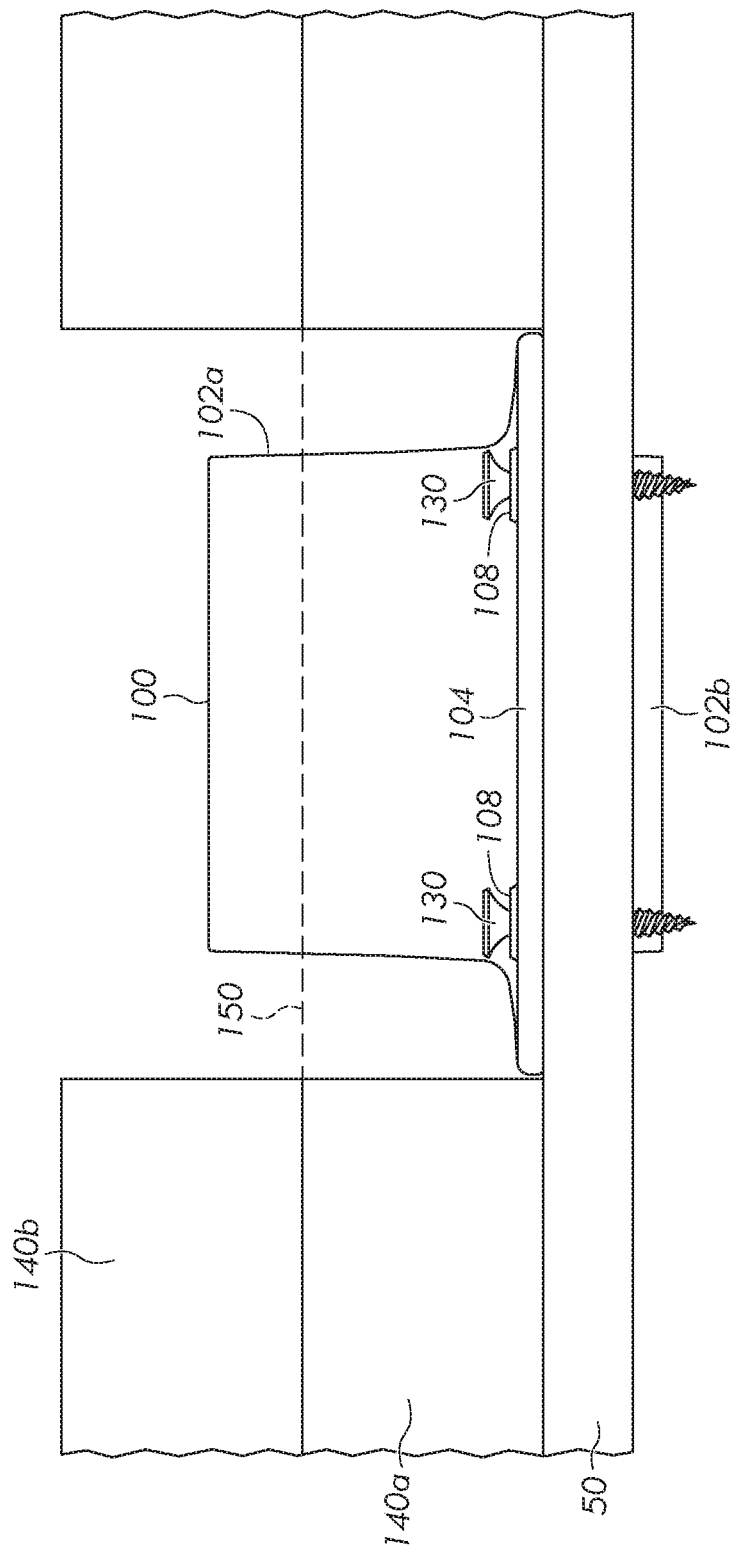

HOLE PROTECTOR DEVICE FOR MECHANICAL, PLUMBING, AND ELECTRICAL (MPE) SYSTEMS

CLAIM TO DOMESTIC PRIORITY

The present application claims the benefit of U.S. Provisional Application No. 62/679,018, filed May 31, 2018, which application is incorporated herein by reference.

FIELD OF THE INVENTION

The present invention relates in general to building construction, and, more particularly, to a hole protector device for penetration holes made during installation of mechanical, plumbing, and electrical systems during building construction.

BACKGROUND OF THE INVENTION

During building construction, various conduits, pipes, and wires are routed through walls and extend vertically through the floor or ceiling. Some pipes carry hot and cold water to sinks, baths, washing machines, etc. Other pipes carry wastewater out to the sewer system or exhaust gases through the roof. Electrical wires are routed to power outlets, wall switches, and lighting fixtures. The various types of systems routed through walls during construction are broadly referred to as mechanical, plumbing, and electrical (MPE) systems.

The MPE are put in place after the frame of a building is constructed, but before the walls are covered in drywall. However, there are typically steps taken to ensure that the frame construction accommodates the later placement of MPE. In most cases, the floors of a multi-story building are framed one at a time. Each floor first has a subfloor sheet of particle board placed down, and then wall frames are constructed on the subfloor.

FIG. 1a illustrates a subfloor 50. Subfloor 50 is formed over a first floor of framing that has already been completed. The wall framing for the first floor includes vertical studs 60 and a top plate 62 having two layers 62a and 62b. Floor joists 64 for the second floor are placed on top plate 62 to support the second floor. Subfloor 50 for the second floor rests on floor joists 64. While second floor construction is discussed, every floor has a similar process.

Once subfloor 50 is disposed on floor joists 64, a plumbing team, or a contractor from another appropriate mechanical or electrical trade, will go through and make holes through the subfloor. FIG. 1a shows an outline 70 where the walls for a bathroom will be. First, the main plumber will go through and make marks 72 where holes need to be formed through subfloor 50 for placing MPE. Marks 72 are formed within wall outline 70 so that the MPE can be run up through the walls once framed.

Next, two assistant plumbers go around and drill holes 80 through subfloor 50 wherever marks 72 were made using a hole saw as shown in FIG. 1b. Holes 80 are drilled prior to framing the next floor's walls for convenience and to guide formation of the wall frames. However, Occupational Safety and Health Administration (OSHA) rules do not allow holes 80 to be left open. Therefore, the plumbers typically insert PVC pipes 90 or another suitable object into holes 80. Pipes 90 are held in place by a wooden wedge or shim 92 inserted through hole 80 with pipe 90 as shown in FIG. 1c.

Pipes 90 fulfil the OSHA requirement to not leave holes 80 open. However, pipes 90 are not securely attached and may be easily removed by pulling up the pipe or kicking the pipe down into hole 80. In many cases, the contractors building the wall frames for the next story will remove pipes 90 when the pipes become a hinderance. The contractor will then cover up hole 80 with the second story frame, which means the plumbing contractor has to go through and drill or cut through the bottom plate of the next story's walls to clear holes 80.

Having a more secure device to cover holes 80 would be desirable, so that the framing contractor is unable to block the holes so easily. However, securely attaching something over holes 80 has not been done in the past because the amount of work required to later remove the device when running MPE through has not been worth it. Therefore, a need exists for a hole protection device that securely protects penetration holes in building construction while also allowing subsequent running of MPE through the openings.

BRIEF DESCRIPTION OF THE DRAWINGS

FIGS. 2a-2g illustrate a hole protection device;

FIGS. 3a-3g illustrate usage of the hole protection device;

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, those skilled in the art will appreciate that the description is intended to cover alternatives, modifications, and equivalents as may be included within the spirit and scope of the invention as defined by the appended claims and the claims' equivalents as supported by the following disclosure and drawings.

Figure 2D:
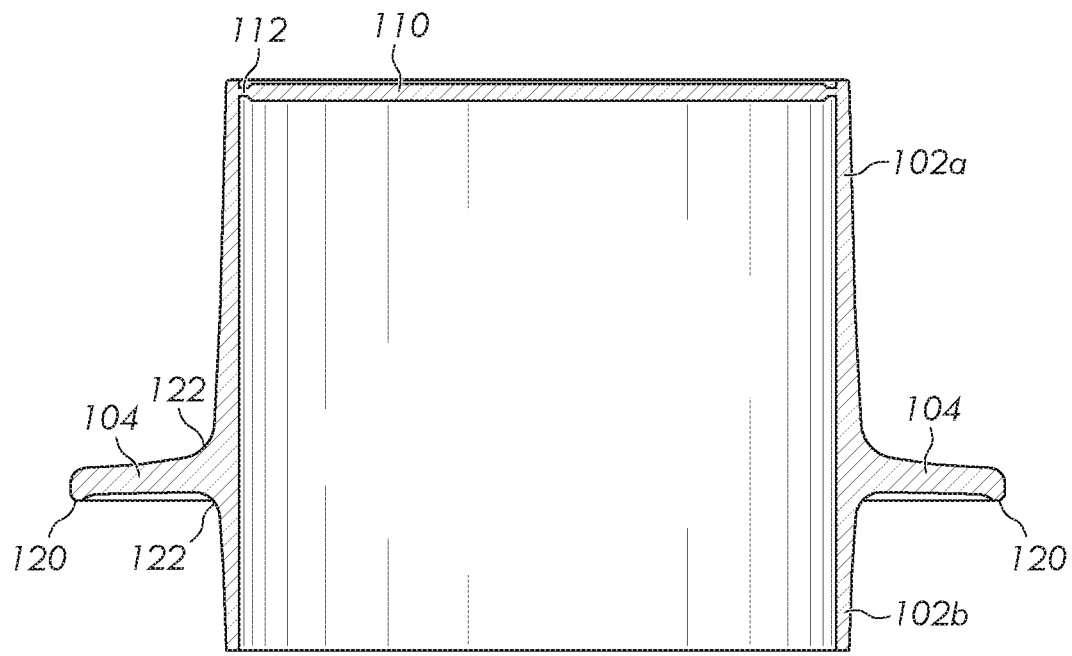

FIGS. 2a-2g illustrate a hole protection device 100 that can be securely attached over MPE hole 80 and still allow MPE to easily be routed through the opening. FIG. 2a is a perspective view of protector 100 from an angle slightly above the device. Protector 100 has a core cylinder 102 with a skirt 104 formed around the cylinder. Protector 100 is designed for a 3-inch diameter hole 80. Therefore, cylinder 102 includes an internal diameter of 2 and ⅞ inches and a height of 2 and ¾ inches. A wall thickness of cylinder 102 is 1/16 inches. The dimensions of cylinder 102 can be modified in other embodiments as desired for a given situation. The diameter of cylinder 102 can be increased or decreased depending on the size of hole 80 and the thickness of MPE being routed. The wall thickness of cylinder 102 can be increased for added strength, or reduced to save material.

In some embodiments, the diameter of cylinder 102 is between ½ and ten inches. In other embodiments, any suitable size is used. The diameter of both cylinder 102 and hole 80 can be selected based on the size of MPE being run. Fire codes generally require less than a ½ inch gap in hole 80 around the MPE. Cylinder 102 has a circular footprint because circular holes 80 are the simplest to form and most MPE is circular. Moreover, the circular shape increases the strength of cylinder 102. However, cylinder 102 could be made square, octagonal, or any other suitable shape.

Skirt 104 includes screw holes 106 formed through the skirt and optional rims 108 formed around the screw holes for added strength. In use, protector 100 is disposed with lower cylinder 102b inserted into or through hole 80, and then the protector is affixed to subfloor 50 using screws, nails, or another appropriate fastener extending through screw holes 106 and into the subfloor. Skirt 104 has a width around cylinder 102 of about ¾ inches and a thickness of between 1/16 and 1/8 inches. Skirt 104 can have a thickness greater than 1/8 inch, e.g., ¼ inch, in larger protectors or for more heavy-duty applications. For a cylinder 102 having an inner diameter of 2 and ⅞ inches, the outer diameter of skirt 104 would be about 4.5 inches. Skirt 104 extends completely around cylinder 102 in a circle with a uniform inner and outer diameter. In other embodiments, skirt 104 is discontinuous and includes a plurality of discrete lobes extending from cylinder 102 with screw holes 106 in the lobes.

Screw holes 106 have a diameter of 0.16 inches in one embodiment, but any suitable screw hole size can be used. Screw holes 106 are approximately centered between the inner and outer diameters of skirt 104. Four screw holes 106 are provided equally spaced around skirt 104, but any suitable number of screw holes can be used. In some embodiments, no screw holes 106 are used. Protector 100 is able to serve the purpose of covering hole 80 without being attached to subfloor 50 with screws. Alternatively, screws or nails could be driven through skirt 104 to attach protector 100 to subfloor 50 without a pre-existing screw hole 106.

The OSHA requirement that hole 80 not be left open is fulfilled by a knock-out cap 110 that encloses the top of cylinder 102. Tabs 112 hold cap 110 within cylinder 102 while allowing the cap to be removed relatively easily. When the contractor team is ready to run MPE through hole 80 and cylinder 102, a contractor simply pops out cap 110 rather than having to totally remove protector 100.

Knock-out cap 110 has a diameter of 2 and ¾ inches and a thickness of 0.8 inches. The diameter of cap 110 is adjusted along with the diameter of cylinder 102 to maintain approximately a 1/16-inch gap between the cap and cylinder. The thickness of cap 110 can be adjusted as desired. Cap 110 is formed at the very top of cylinder 102. However, cylinder 102 can extend over cap 110 in other embodiments.

Tabs 112 that hold cap 110 in cylinder 102 are 0.4 inches thick compared to the thickness of 0.8 inches for cap 110. Thinner tabs 112 allow removing cap 110 by breaking the tabs while reducing the likelihood of breaking the cap into multiple pieces and then having to remove the pieces separately. A length of tabs 112 along the perimeter of cylinder 102 is between 0.15 inches and 0.225 inches. All specified sizes and measurements can be adjusted as desired. While 4 tabs 112 are illustrated, any suitable number of tabs can be used.

Skirt 104 delineates cylinder 102 into an upper cylinder 102a above the skirt and lower cylinder 102b below the skirt. Upper cylinder 102a extends two inches above skirt 104, and lower cylinder 102b extends ¾ inches below skirt 104. Again, the dimensions can be modified as desired in other embodiments. Upper cylinder 102a extending above skirt 104 helps keep the framer from building over hole 80. Upper cylinder 102a blocks the framing contractor from laying a piece of lumber directly on subfloor 50 over hole 80. Upper cylinder 102a is taller than the thickness of a single 2×4 piece of lumber to block a second framing layer from overlapping hole 80. In some embodiments, cylinder 102 does not extend above skirt 104. While the effectiveness of protector 100 blocking the framing contractor is reduced, the protector is still able to cover holes 80 as required by OSHA rules.

Having lower cylinder 102b extend below skirt 104 helps the user locate hole 80 when installing protector 100. An installer will likely use a protector 100 with a cylinder 102 outer diameter that is slightly smaller than the diameter of hole 80. If the installer has cylinder 102 misaligned with hole 80, lower cylinder 102b will contact subfloor 50. The installer can feel the location of hole 80 using lower cylinder 102b and move protector 100 until the lower cylinder extends into the hole. Lower cylinder 102b is a convenience when installing protector 100 because of the assistance provided in alignment. However, lower cylinder 102b is not used in some embodiments. Protector 100 is still able to serve the purpose of protecting hole 80 per OSHA requirements and blocking the next story's frame without having a lower cylinder 102b extending below skirt 104.

Both upper cylinder 102a and lower cylinder 102b are optional, and, in some embodiments, no cylinder 102 is used at all. Cap 110 can be directly attached to skirt 104 by tabs 112 without cylinder 102 in a flat protector embodiment.

FIG. 2b is a perspective view of protector 100 from a higher angle than FIG. 2a to better illustrate gap 114 between cap 110 and cylinder 102. Tabs 112 bridge gap 114 to attach cap 110 to cylinder 102.

FIG. 2c illustrates protector 100 from an angle below the protector. An optional rim 120 extends around the edge of skirt 104. Rim 120 extends down 0.03 inches from the bottom of skirt 104 and is shaped with a circular cross-section having a 0.04-inch radius. Rim 120 provides a circular point of contact between subfloor 50 and skirt 104 at or near the outermost area of the skirt. Rim 120 supports installed protectors 100 as weight is added, e.g., from a contractor stepping on the protector. If added weight misshapes skirt 104, rim 120 maintains contact with subfloor 50 in a circle at the outermost portion of the skirt. Without rim 120, the point of contact between skirt 104 and subfloor 50 moves inward toward cylinder 102 as weight is added, weakening the strength of the skirt.

FIG. 2d shows a cross-section of protector 100 through tabs 112 to better illustrate the relative shapes and thicknesses of the various parts. Both upper cylinder 102a and lower cylinder 102b are thicker near skirt 104, and include a fillet 122 at the corners where the skirt and cylinder meet. The inner surface of cylinder 102 is vertically plumb. The outer surface of upper cylinder 102a includes a slope of 1.5 degrees relative to vertical near the top of protector 100, and a slope of 3 degrees near skirt 104. Lower cylinder 102b includes a slope of 2 degrees relative to vertical near the bottom of protector 100, and a slope of 4 degrees near skirt 104. The bottom surface of skirt 104 slopes up toward cylinder 102 at 1.25 degrees. The top surface of skirt 104 slopes up toward cylinder 102 at 3.5 degrees near the outer diameter and 8.5 degrees near fillet 122. As above, any of the angles and measurements can be modified as desired. The outer surface of cylinder 102 can be vertical as with the inner cylinder or can be thicker near skirt 104 to strengthen protector 100.

Figure 2E:
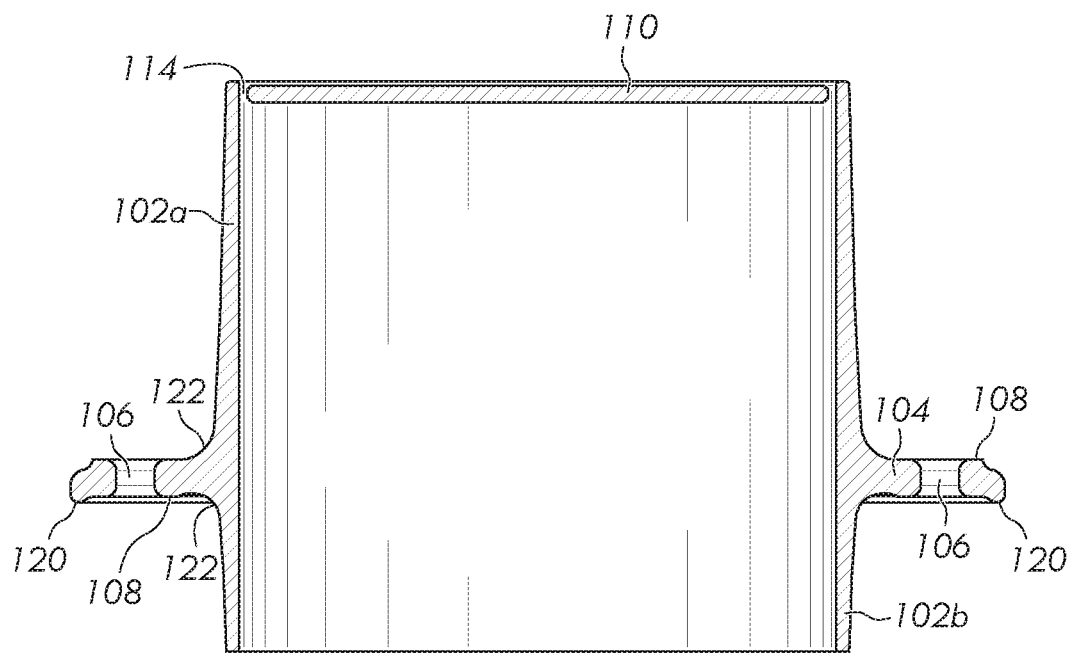

FIG. 2e is a cross-sectional view of protector 100 through screw holes 106. Rims 108 around screw holes 106 include a thickness of 0.181 inches with an inner diameter of 0.185 inches and an outer diameter of 0.415 inches. The bottom surface of rims 108 are 0.005 inches below the bottom surface of skirt 104 toward cylinder 102 and level with the bottom surface of the skirt away from the cylinder. Having a thickened rim 108 around screw holes 106 improves the structural integrity of protector 100 when external forces act on a protector that is screwed down to subfloor 50.

Figure 2F:
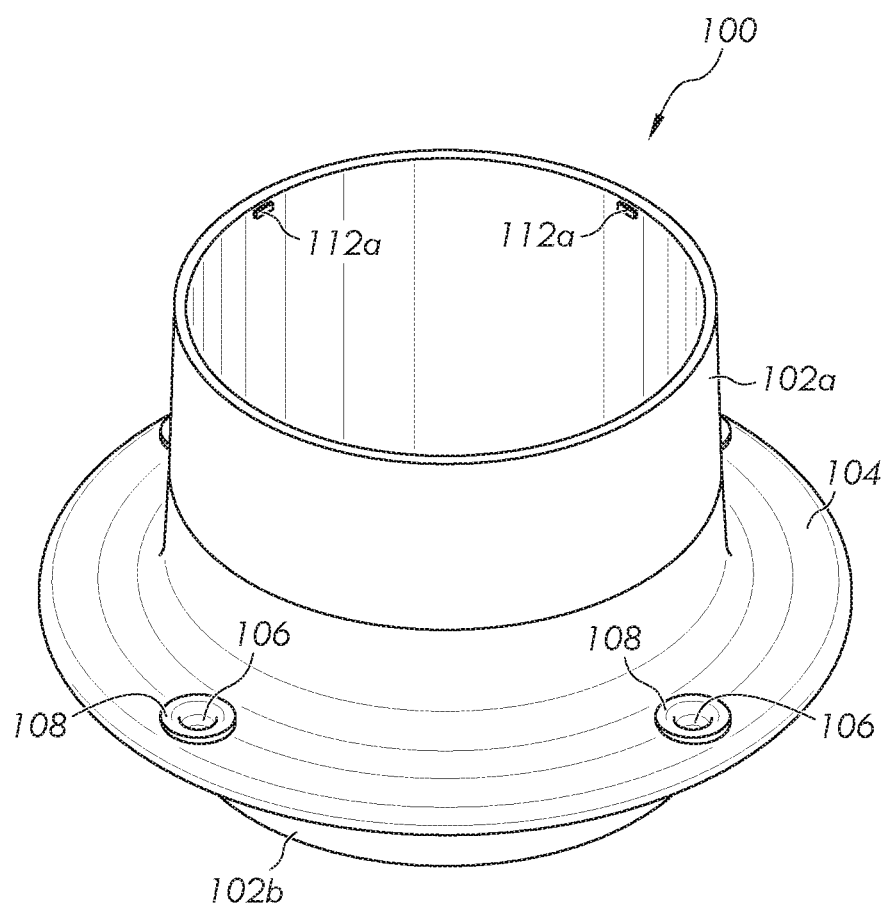
Figure 2G:
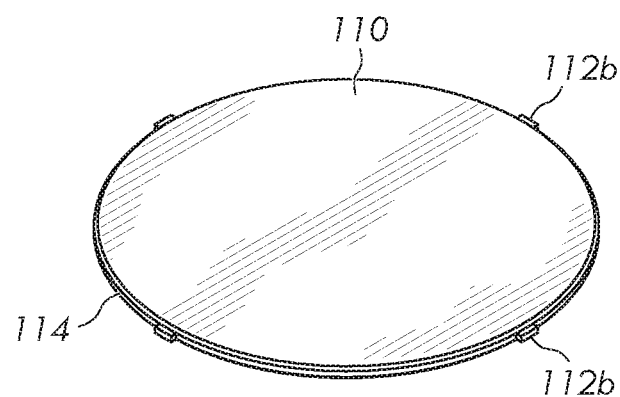

FIG. 2f illustrates protector 100 with cap 110 removed, and FIG. 2g illustrates cap 110 after being removed. A portion 112a of tabs 112 remains with cylinder 102, and a portion 112b remains with cap 110. Separating cap 110 from cylinder 102 by breaking tabs 112 allows MPE to be run through protector 100.

Protector 100 is made of acrylonitrile butadiene styrene (ABS), Polyethylene Terephthalate (PET), Polypropylene (PP), polylactic acid (PLA), polyvinyl chloride, or another suitable polymer material. In other embodiments, protector 100 is formed from aluminum, steel, paperboard, wood, or any other suitable material. Protector 100 can be formed by 3D printing, molding, casting, machining, or using any other suitable manufacturing process. Protector 100 is generally formed as a unit with cylinder 102, skirt 104, and cap 110 manufactured as a single piece. In some embodiments, skirt 104 is manufactured separately and attached to cylinder 102 by welding, an adhesive, a fastener, or another suitable mechanism. Cap 110 can also be manufactured separately and attached to cylinder 102.

Figure 1A:
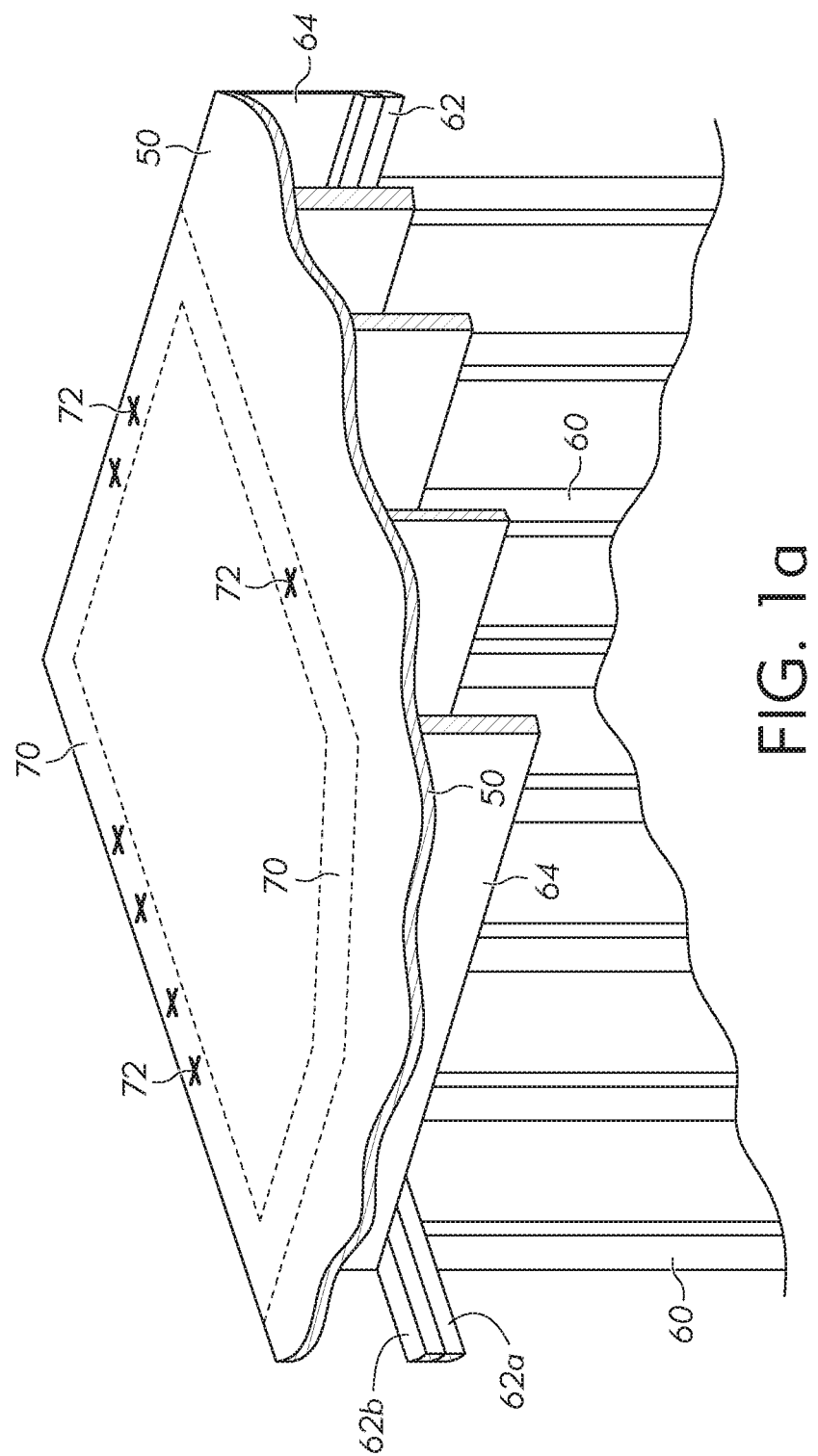
FIGS. 1a-1c illustrate forming MPE holes in a building frame subfloor.
Figure 1B:
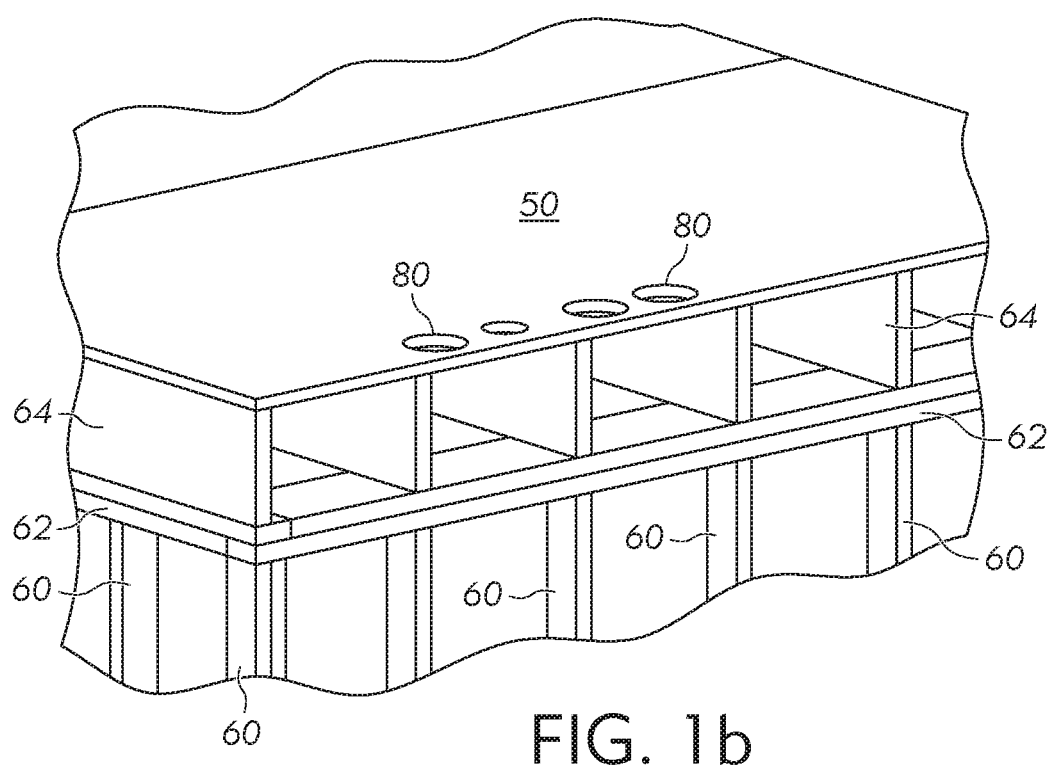
Figure 1C:
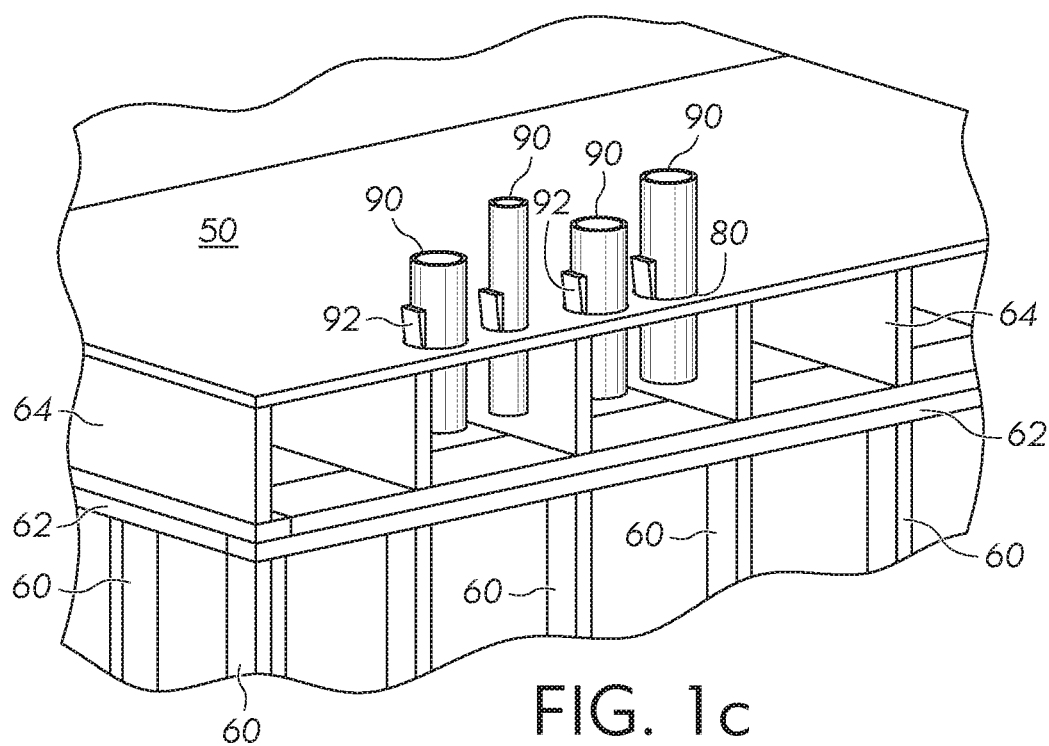
Figure 3A:
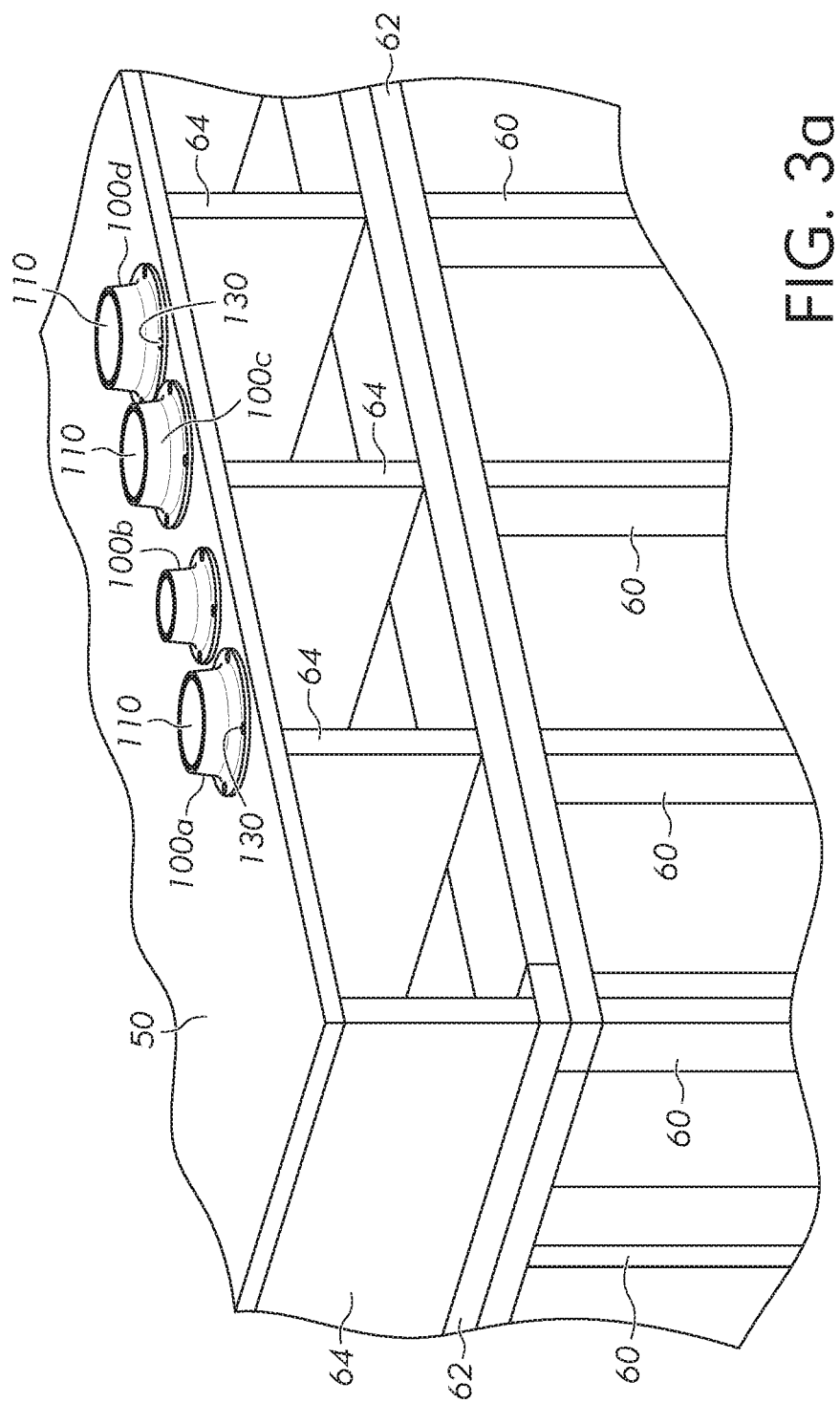

FIGS. 3a-3g illustrate usage of protector 100. Continuing from FIG. 1b, the appropriate subcontractors place protectors 100 over holes 80 and fastens the protectors to subfloor 50 using screws 130. First, protector 100 is placed with lower cylinder 102b in hole 80. FIG. 3b illustrates a cross-sectional view showing that rim 120 under skirt 104 is the only point of contact with subfloor 50.

Next, screws 130 are added to keep protector 100 in place. Screws 130 can be screwed into subfloor 50 without tightening the screws down completely, which allows some wiggle of protector 100. Screws 130 are loose enough that the screws do not press rim 108 against subfloor 50, and rim 120 is still the only contact between skirt 104 and the subfloor. Screws 130 can be tightened down completely such that rims 108 contact subfloor 50, but the benefit of rim 120 to strength of protector 100 may be reduced.

Different sizes of protector 100 can be made and kept in stock so that an appropriate protector can be selected for each hole 80. As the contractor goes around forming protectors 100a, the markings 72 will indicate how large of a hole to form. The contractor will make hole 80 using the proper hole bit for the indicated size, and then grab a protector 100 of the appropriate size to cover the hole. In FIG. 3a, hole protector 100a, 100c, and 100d have a cylinder 102 with a four-inch diameter, and protector 100b has a 2-inch diameter cylinder. The size of a hole 80, and therefore the size of a protector used, is determined based on the size of MPE being run through the hole. Usually, the width of skirt 104 around any size cylinder 102 remains fixed at ¾ inches. However, in some embodiments the sizes of skirt 104 and screw holes 106 scale with the size of cylinder 102.

Protectors 100 can also be made in different colors for a variety of purposes. In one embodiment, the color of protector 100 is used to indicate the type of MPE that will ultimately be run through the protector. For instance, red and blue protectors 100 could be used for hot and cold water, yellow for electrical wires, green for sewer drain, etc. Bright neon colors can be used to increase visibility, and therefore safety, during construction.

Figure 3C:
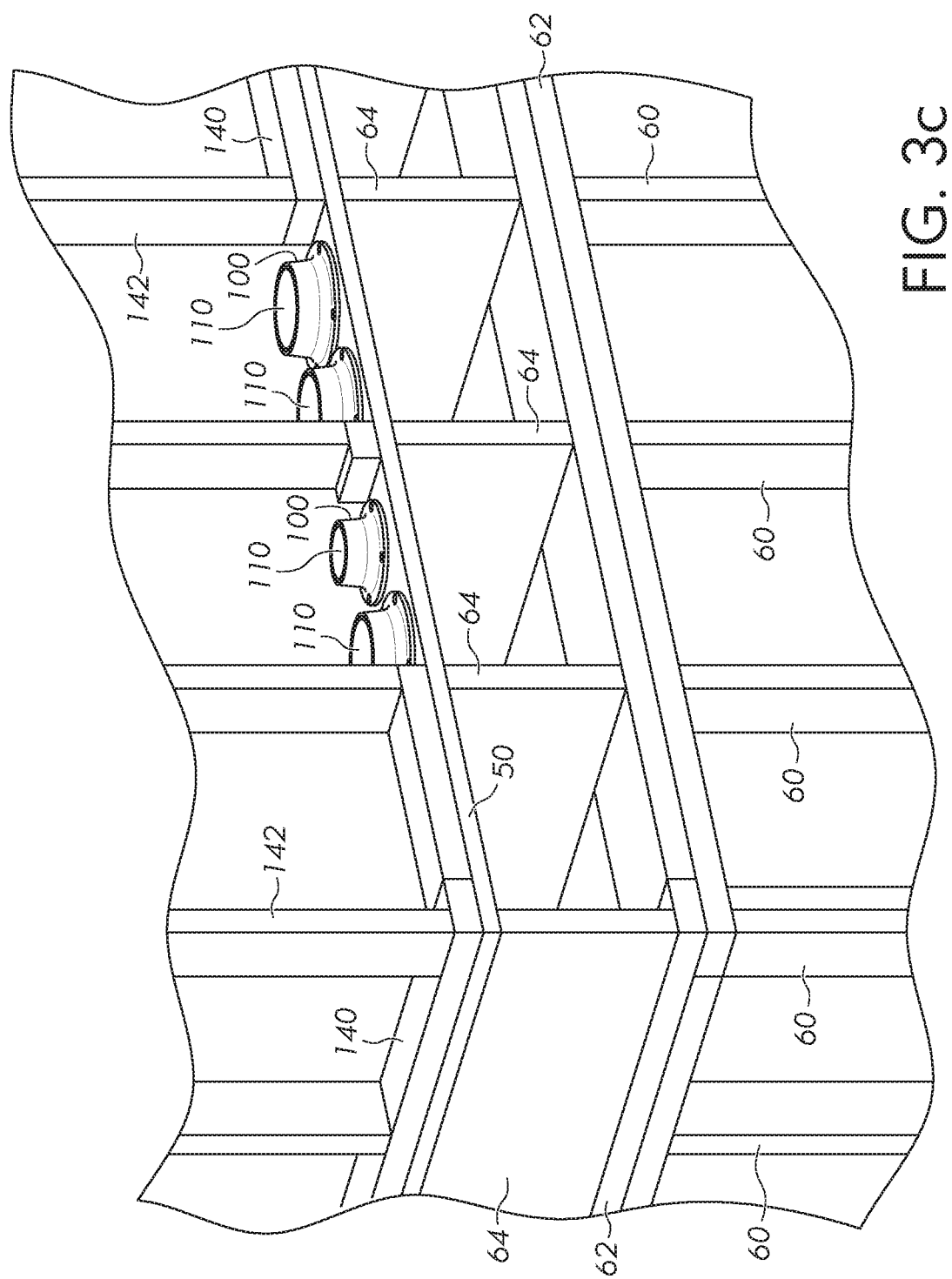

With protectors 100 in place over holes 80, the framing contractor comes through and puts together the next story's frame. Protectors 100 are not easily removed or discarded, and therefore force the frame builder to work around holes 80. FIG. 3c shows the second story frame with lower plate 140 and vertical wall studs 142 built around holes 80 and protectors 100. The framer builds gaps into lower plate 140 to accommodate protector 100 because the protector is not easily removed.

In some cases, the framer will use a double lower plate 140 by stacking two layers of 2×4 lumber, similar to top plate 62. The height of upper cylinder 102a ensures that the framer is not able to place the second layer of lower plate 140 extending over hole 80. FIG. 3d shows a height comparison. The first bottom plate layer 140a goes up to the height of dotted line 150. The top of protector 100 is above line 150. Therefore, the second bottom plate layer 140b will not be able to lie flat on the first bottom plate layer 140a if the second layer overlaps cylinder 102. Upper cylinder 102a can be shorter if blocking a second layer is not important, or could be made taller to block three or more 2×4 layers.

Figure 3E:
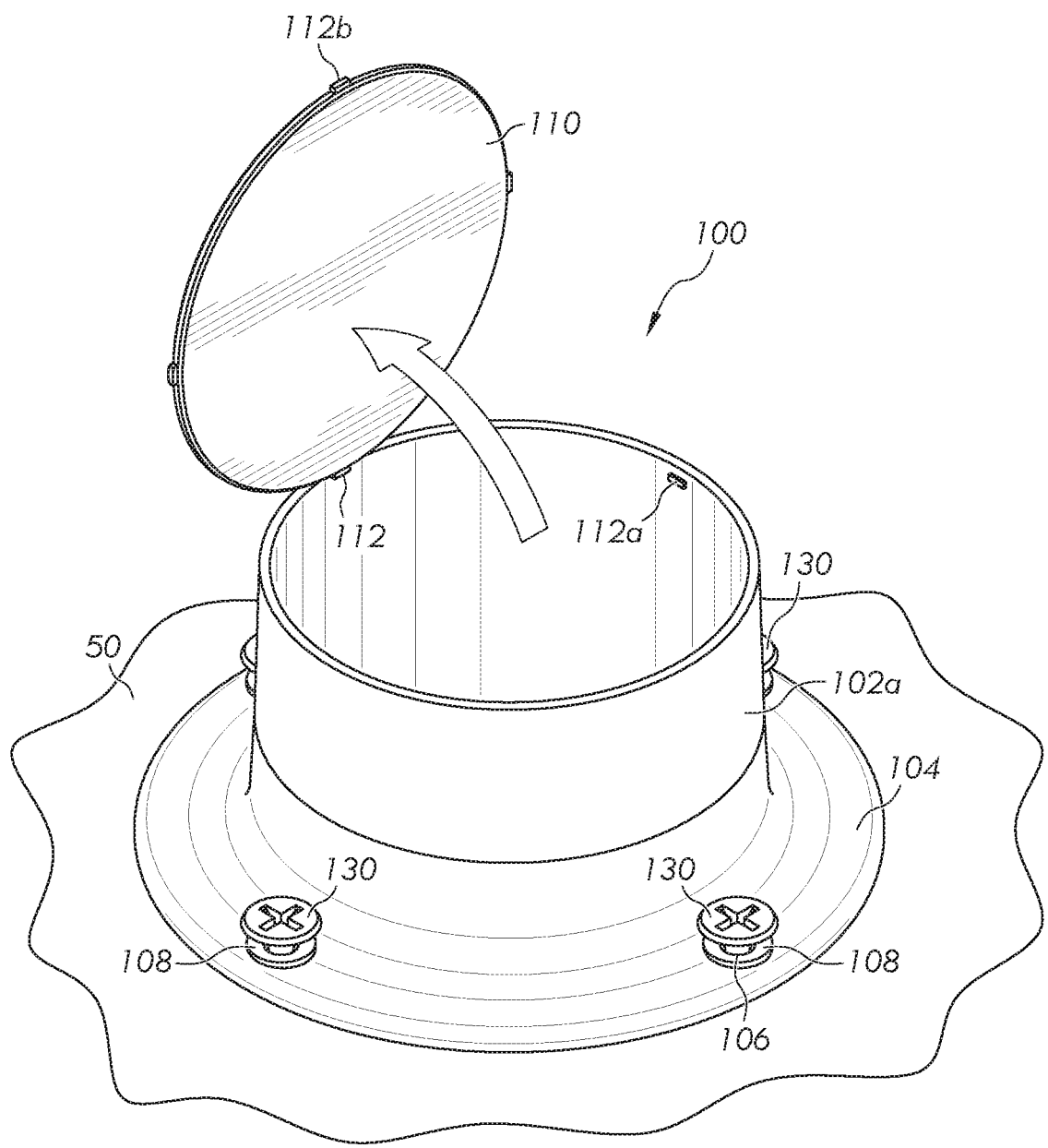

Once the contractors are ready to go back and install the MPE, generally after the building frame is complete, cap 110 is removed to reopen hole 80. FIG. 3e shows cap 110 being removed. An easy method is to hit cap 110 with a hammer to break all but one or two of tabs 112, and then cap 110 can easily be removed by hand. Depending on the strength of the protector 100 material, pressing on cap 110 by hand may be sufficient to break tabs 112.

Figure 3F:
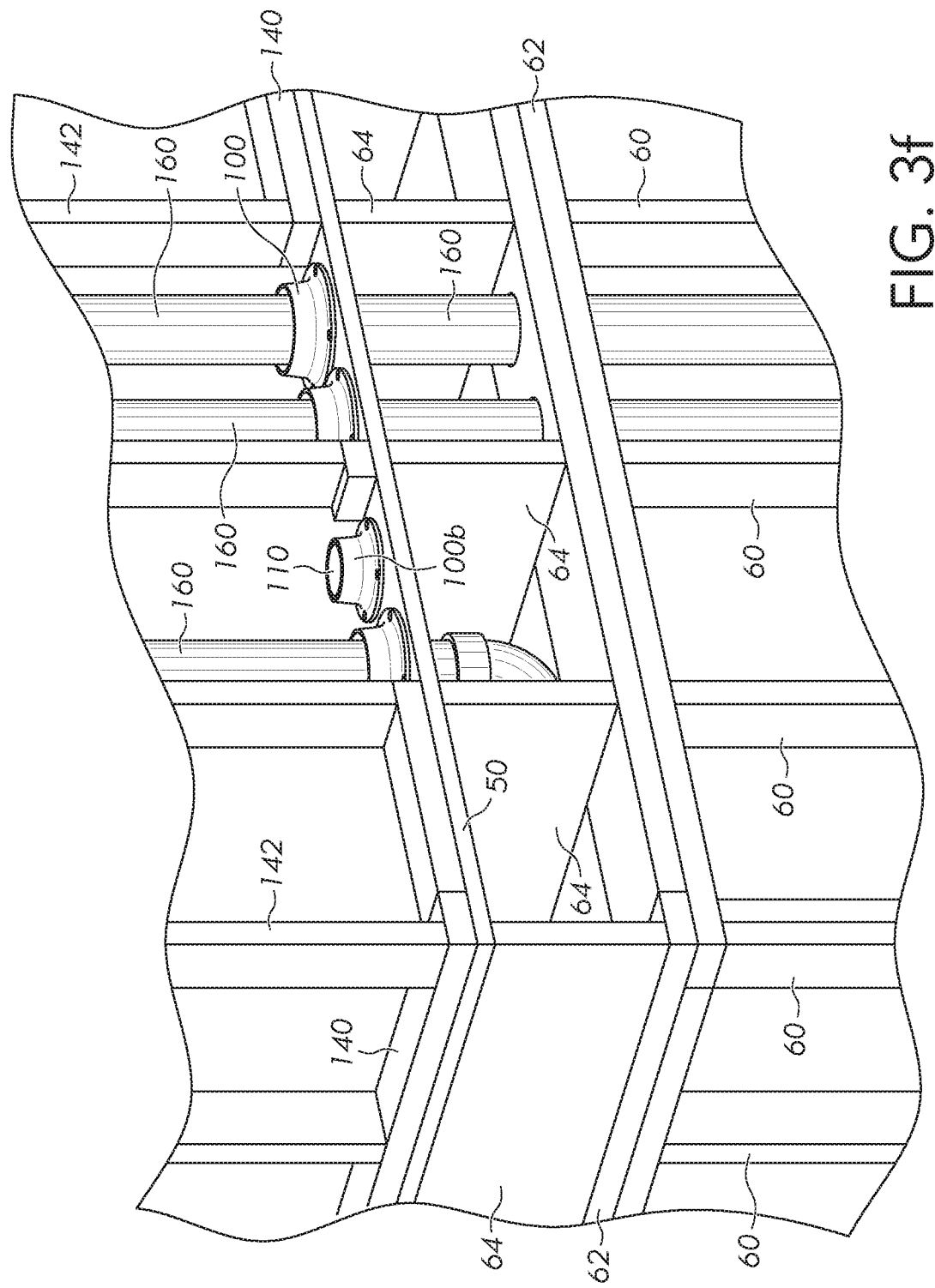

With cap 110 removed, pipe or MPE 160 can be placed through hole 80 and cylinder 102, as shown in FIG. 3f. An MPE can extend straight down through top plate 62 of the first floor. The holes through top plate 62 can be formed at the same time as holes 80, or later during placement of MPE 160. Alternatively, MPE can be routed horizontally between floor joists 64. The MPE can be for any suitable purpose. In FIG. 3f, protector 100b has cap 110 remaining because the MPE for that protector will be for electrical and placed by a separate contractor later.

Figure 3G:
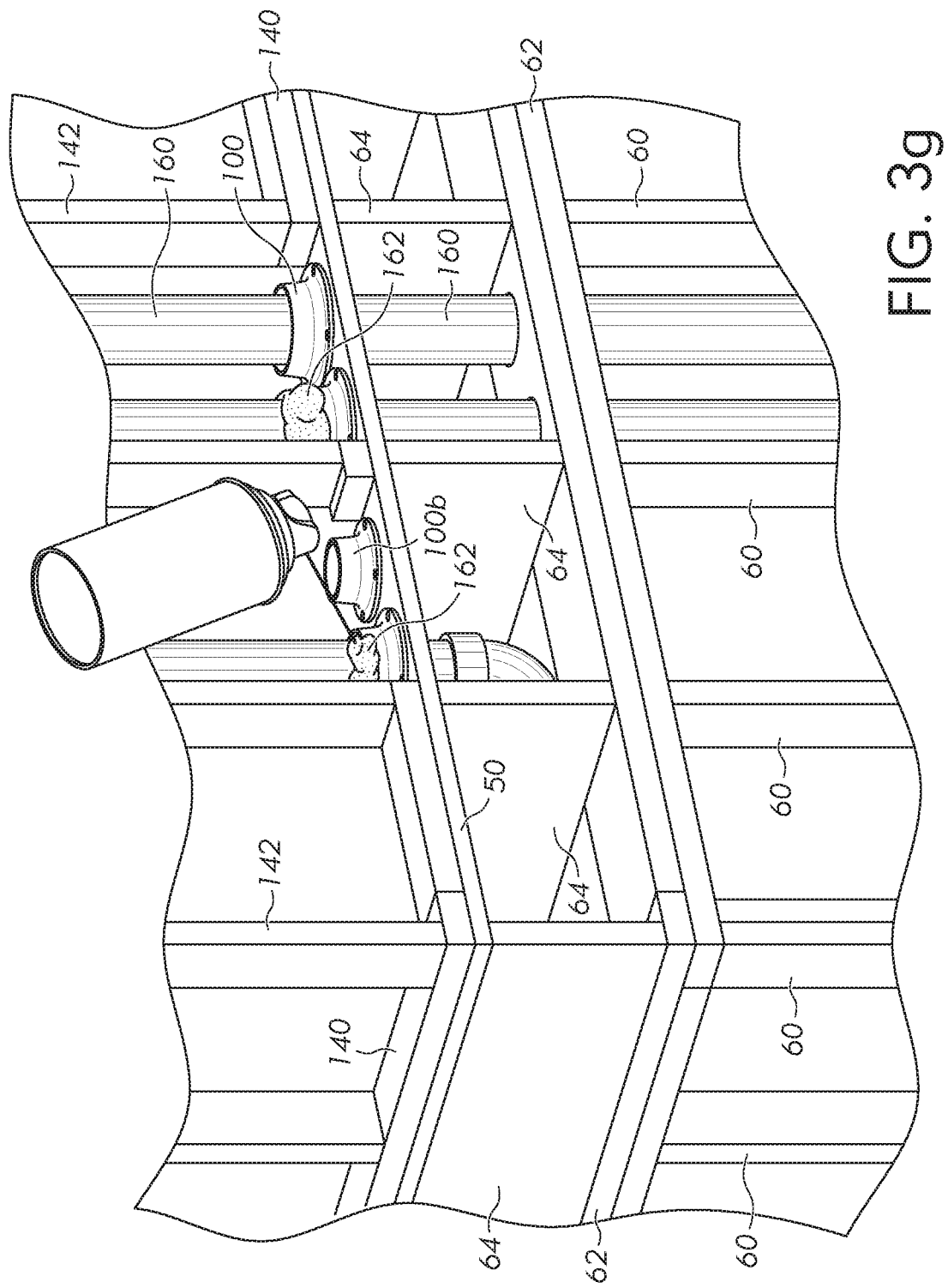

Typically, there will be a noticeable gap between the outside diameter of MPE 160 and the inner diameter of cylinder 102. The gap is usually limited to ½-inch by municipal fire codes. The gap makes placing MPE through protectors 100 more convenient, but most fire codes do not allow the gap to be left permanently. In FIG. 3g, the install is completed by spraying a fire-retardant foam 162 to fill the gap between protector 100 and MPE 160. Fire-retardant foam 162 reduces the likelihood of fire spreading between floors of the building. Alternatively, a fire-retardant caulking or other fire-retardant material can be disposed between protector 100 and MPE 160.

Figure 4A:
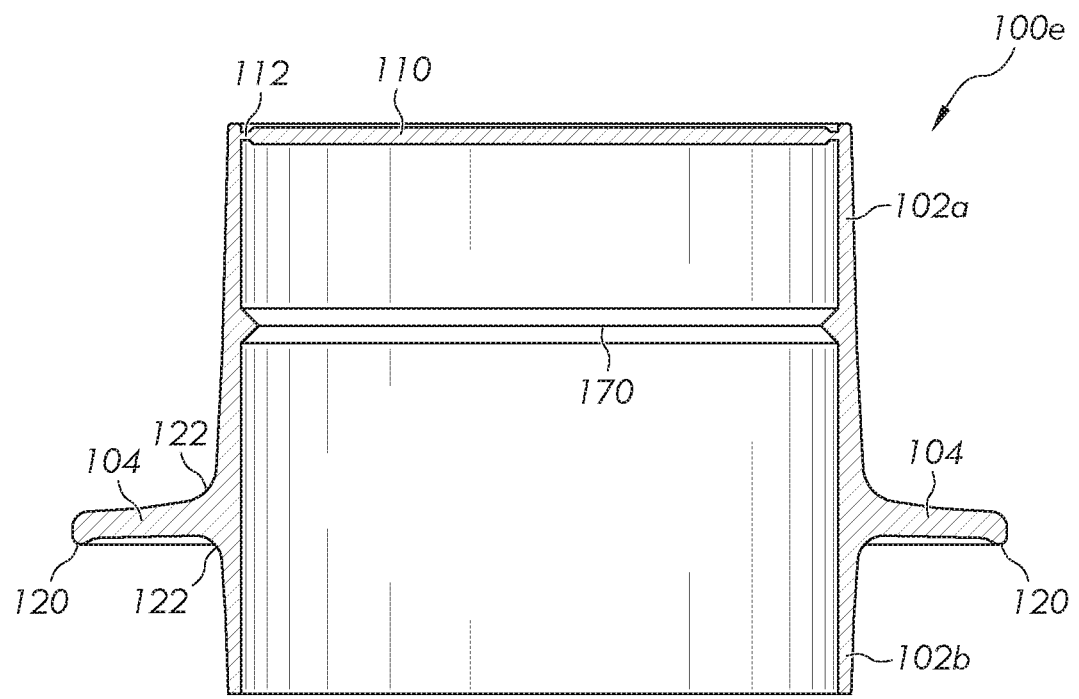
FIGS. 4a-4c illustrate a pipe clamp used with the hole protection device.
Figure 4B:
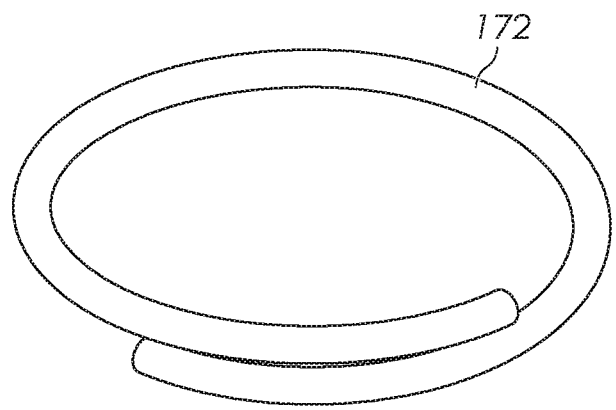
Figure 4C:
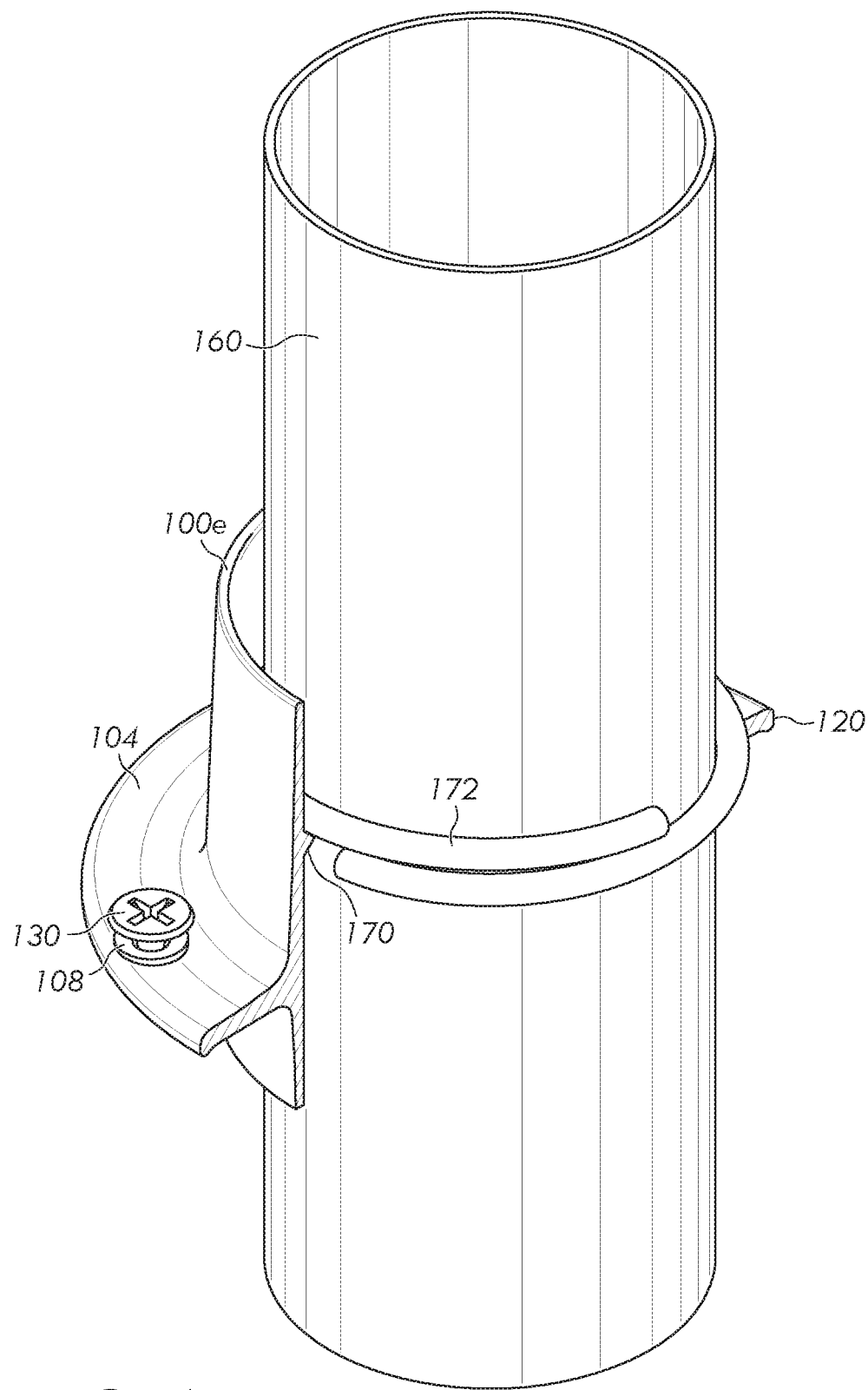

FIGS. 4a-4c show an embodiment with protector 100e modified to include an internal ridge 170 around the internal diameter of cylinder 102. FIG. 4a is a cross-section of protector 100e with ridge 170. FIG. 4b shows a clamp 172 that can be placed around MPE 160. FIG. 4c shows clamp 172 disposed around MPE 160, and the MPE disposed within protector 100e. Clamp 172 is formed of a flexible metal that springs back into the shape shown in FIG. 4b after being stretched. A contractor can flex clamp 172 to create an opening between the two ends, stick the clamp around MPE 160, and then release the clamp to reclose the two ends with the MPE within the clamp. One clamp 172 is capable of being used with a range of MPE diameters, because the clamp springs closed and will adapt to larger or smaller MPE. Clamps 172 can come in a few different sizes for different ranges of MPE diameter. Alternatively, an elastic O-ring could be placed around MPE instead of clamp 172.

The combined thickness of clamp 172 and ridge 170 is larger than the gap between MPE 160 and protector 100e, such that when the MPE is extended through the protector the clamp contacts the ridge. Clamp 172 rests on ridge 170 and supports the weight of MPE 160. A contractor can use proper placement of clamp 172 to align MPE 160 within protector 100e during installation. The sloped surfaces of clamp 172 and ridge 170 help push MPE 160 toward the center of cylinder 102, ensuring a substantially uniform gap between protector 100e and the MPE around an entire perimeter. The uniform gap provides a uniform thickness of fire-retardant caulking or foam when the gap is filled as shown in FIG. 3g. The contact between clamp 172 and ridge 170 also slows the flow of fire-retardant material through cylinder 102, thus helping contain the fire-retardant material within the gap. In one embodiment, ridge 170 is formed one inch down from the top of cylinder 102 because fire codes commonly require one inch of fire-retardant material. In other embodiments, ridge 170 can be formed at any suitable location within cylinder 102.

Figure 5A:
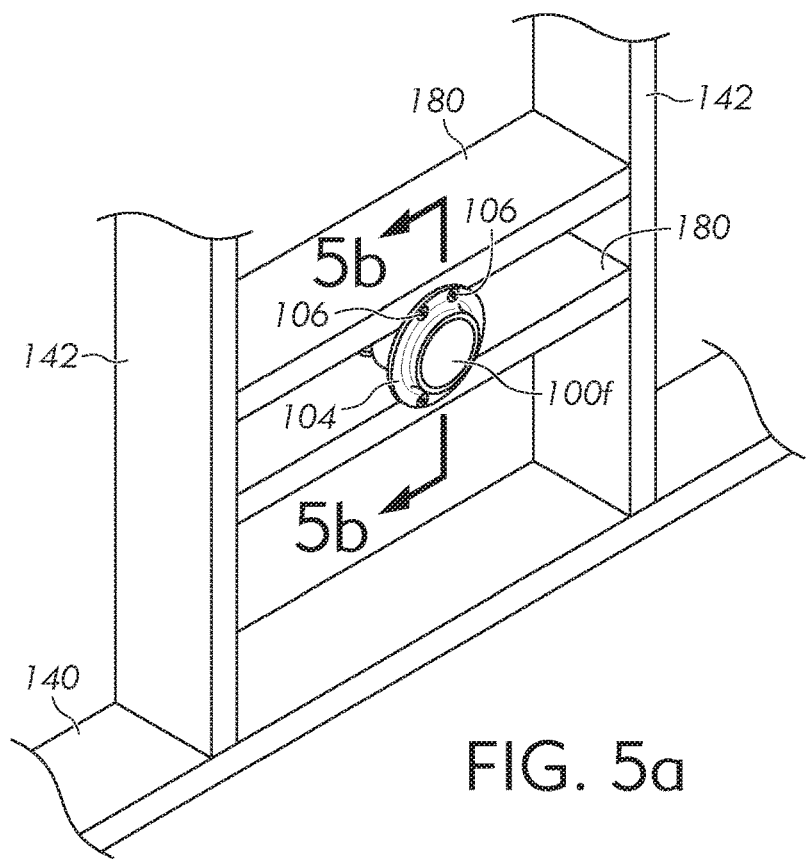
FIGS. 5a-5d illustrate a hole protector used for routing MPE horizontally through a wall.
Figure 5B:
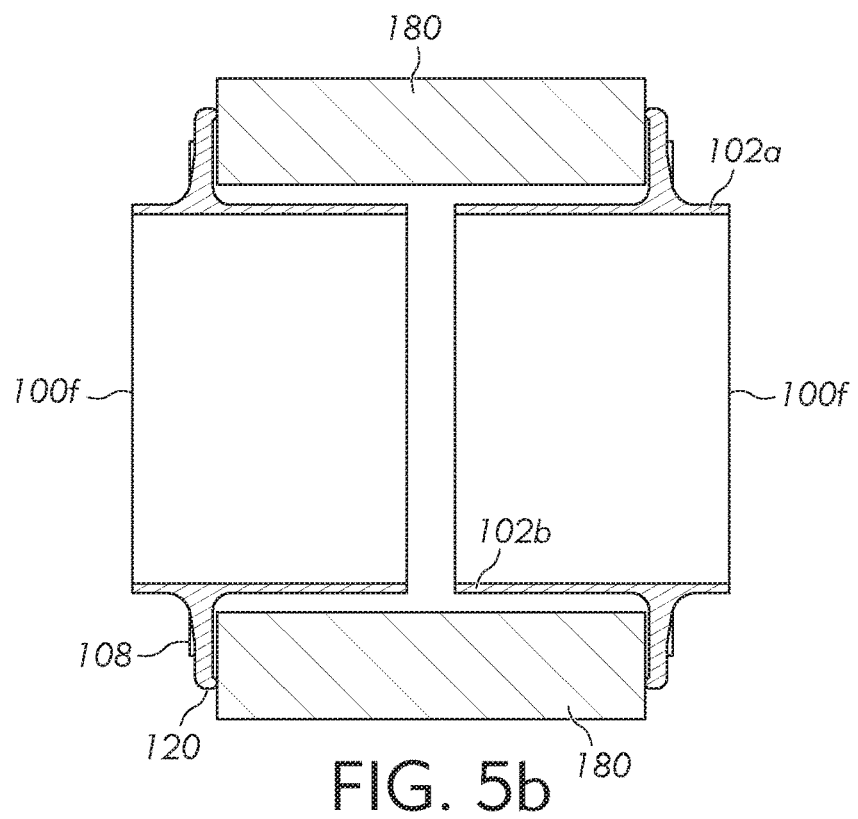

FIGS. 5a-5d illustrates protectors 100f used in a horizontal orientation to route MPE through a wall. Two horizontal beams 180 are mounted between two adjacent vertical studs 142 to support protectors 100f. In FIGS. 5a and 5b, two protectors 100f are installed on beams 180. FIG. 5a is a perspective view and FIG. 5b is a cross-section. Protectors 100f differ from protector 100 in a few ways. First, screw holes 106 are reoriented. The screw holes are biased toward two opposite sides of skirt 104 so that all four screw holes can be placed over the side surfaces of beams 180. With the holes spread out at 90 degrees from each other, only two opposite holes would be able to be screwed into beams 180. Protector 100f can alternatively be screwed onto two vertical beams properly spaced. In another embodiment, a protector 100f is screwed onto four beams shaped in a square, which would allow four screw holes 106 to be spaced evenly 90 degrees apart.

Secondly, the position of skirt 104 on cylinder 102 is modified. Upper cylinder 102a is shortened to be approximately the same thickness as drywall or other wall covering being used so that the top of protector 100f is approximately flush with the wall covering. Lower cylinder 102b is optionally lengthened. Lower cylinder 102b can be lengthened so that the cylinders of the two protectors 100f contact or nearly contact to enclose the cylinder within the wall. Alternatively, a separate piece of pipe can be placed around both lower cylinders 102b within the wall to enclose the space between protectors 100f. The pipe can be press fit or screw onto lower cylinders 102b, or simply rest loosely. In some embodiments, the bottom of lower cylinder 102b is removeable by unscrewing in case the wall is not thick enough to accommodate the length of two protectors 100f. Alternatively, the contractor can cut one or both protectors 100f to length as necessary.

Figure 5C:
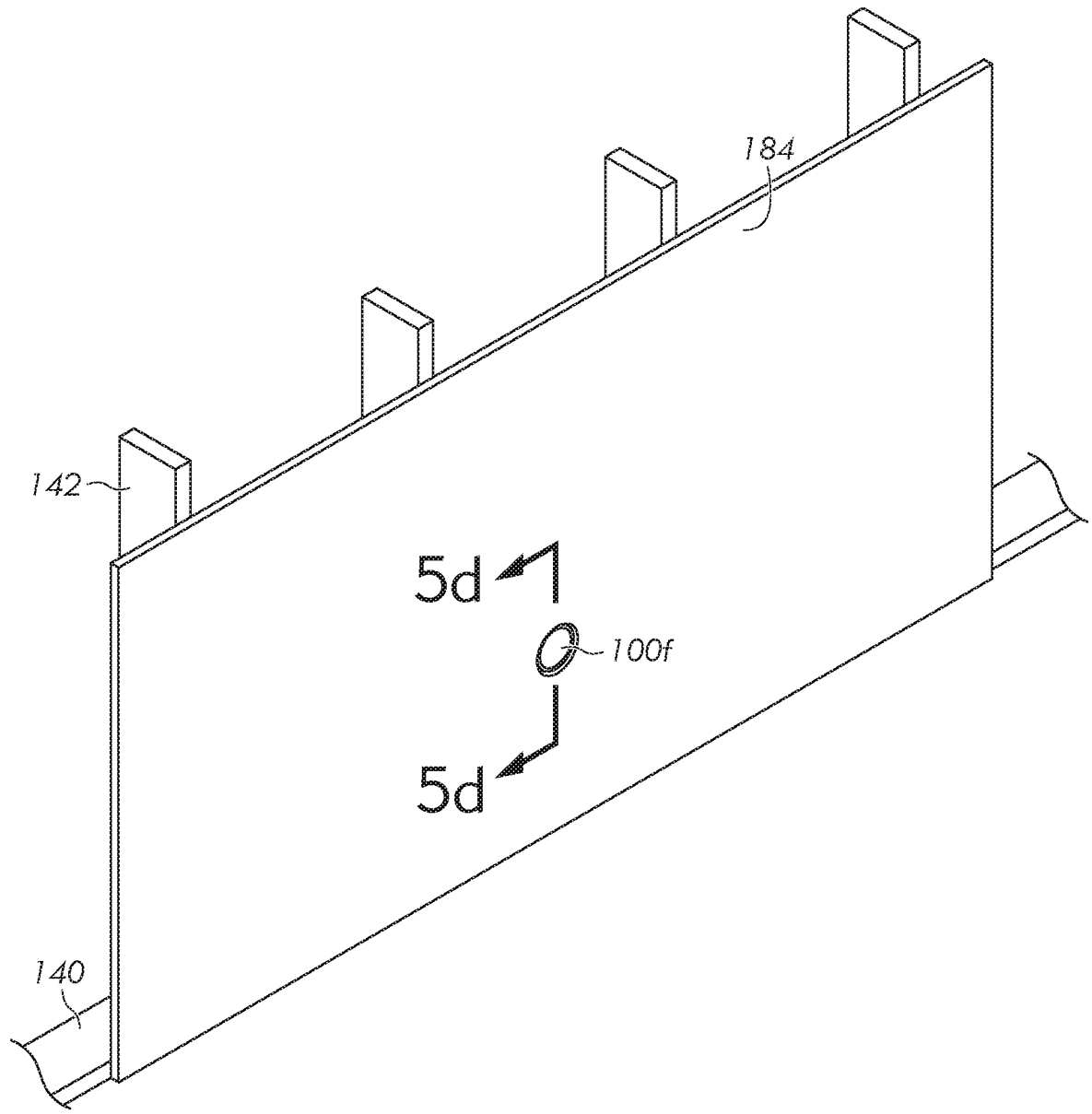
Figure 5D:
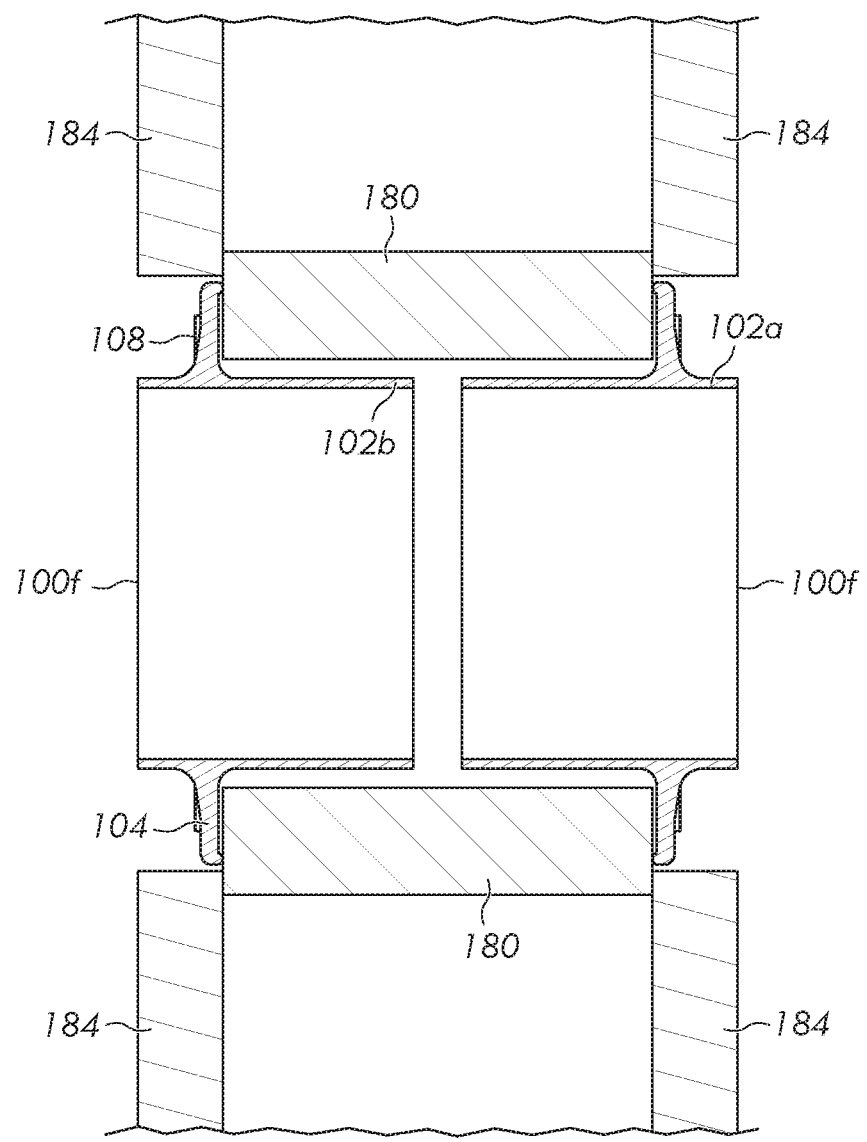

In FIGS. 5c and 5d, drywall 184 is installed over the wall frame. FIG. 5c is a perspective view and FIG. 5d is a cross-section. Drywall 184 includes a hole around protectors 100f for routing of MPE through the protectors. In some embodiments, extra protectors 100f are placed in a wall for future use, and may be papered or puttied over to be indistinguishable from the rest of the wall. Caps 110 are removed at a later date when the path is needed for MPE.

Protectors 100f are commonly used in multi-unit housing, when two adjacent units have adjacent bathrooms. The water, sewer, electrical, etc. for the two adjacent bathrooms are routed through the common wall. When adjacent units share a common wall, the wall is usually a fire wall by code. Once an MPE is installed through protector 100f, the space between the protector and MPE is filled with a fire-retardant caulking or other fire-retardant material.

Figure 6A:
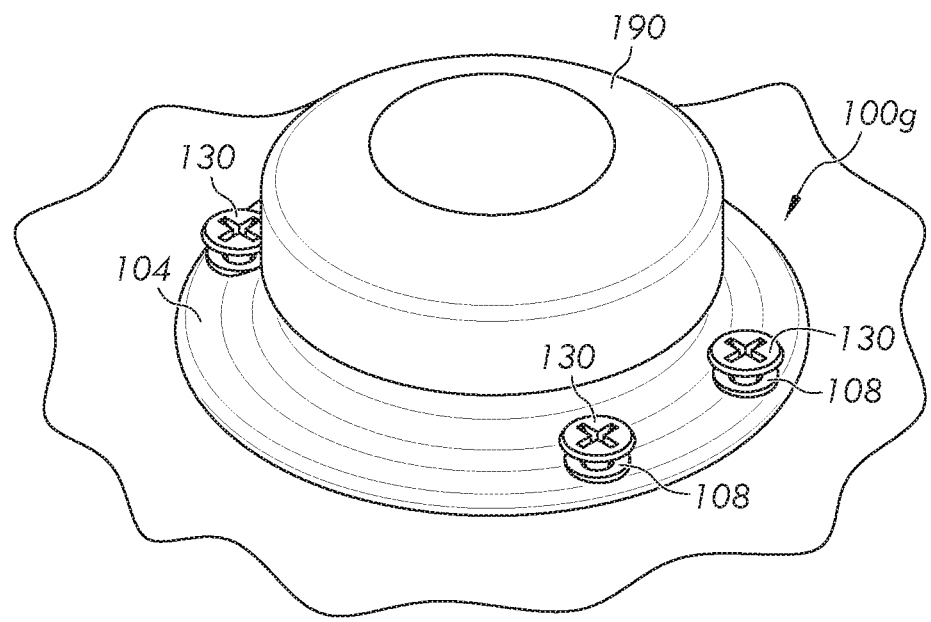
FIGS. 6a-6c illustrate a hole protector with a screw cap.
Figure 6B:
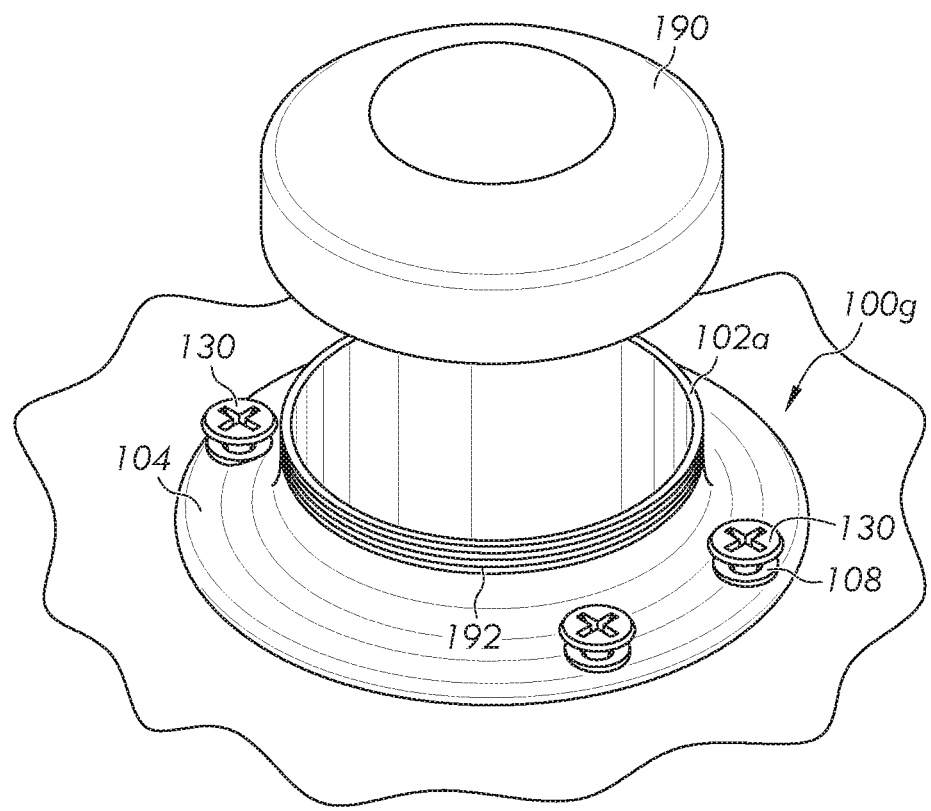
Figure 6C:
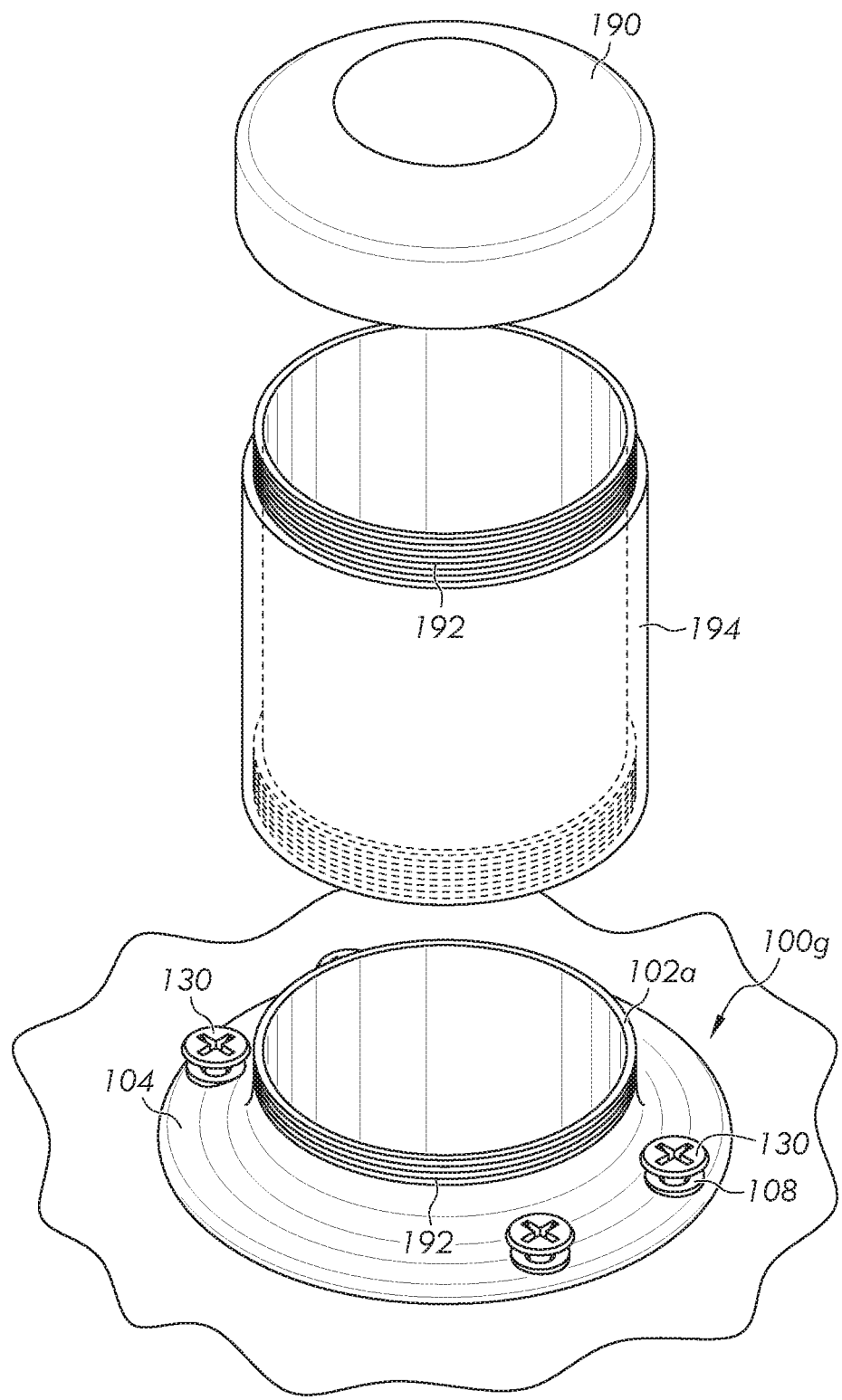

FIGS. 6a-6c illustrate a protector 100g with a screw-on cap 190. Cap 190 screws onto upper cylinder 102a rather than being punched out as with cap 110. FIG. 6a illustrates cap 190 installed on protector 100g, and FIG. 6b illustrates cap 190 removed to reveal threads 192. The inside of cap 190 includes corresponding threads. Having cap 190 screw on provides a better seal of the inside of cylinder 102 compared to cap 110 with gap 114. Especially with a protector being used horizontally, putty, paint, and other material may get into cylinder 102 and cause problems later on. Screwing on cap 190 keeps the inside of cylinder 102 reduces the amount of contaminates getting stuck inside the protectors.

In some embodiments, cap 190 is essentially the majority of upper cylinder 102a, so that when the cap is removed the height of protector 100 over subfloor 50 is substantially reduced. In another embodiment, the threads inside cap 190 are capable of digging into the material of protector 100. A user can remove cap 190, cut off a portion of the top of cylinder 102, and then reinstall the screw cap onto the cut cylinder. The screw-on cap can be sold separately, and only used in cases where the top of cylinder 102, including cap 110, needs to be removed. A protector can have a cap that is re-installable after cutting cylinder 102 on both ends of the cylinder, which is particularly useful for keeping the inside of the cylinder clean in the wall protector embodiment of FIGS. 5a-5d.

FIG. 6c shows cap 190 used with an extension cylinder 194. Cylinder 194 includes threads 192 on the top of the cylinder that are substantially identical to threads 192 on protector 100g. Cylinder 194 includes internal threads at the bottom of the cylinder that are substantially identical to threads within cap 190. Cap 190 can be installed on protector 100g directly, or with cylinder 194 intervening to add height. The protector can be sold with cylinder 194 installed, then a contractor can remove the cylinder and re-attach cap 190 without the cylinder to reduce the height of the protector as needed. Alternatively, protector 100g can be sold without cylinder 194, and a contractor can remove cap 190 from the protector and add the cylinder to extend the height as needed.

Figure 7:
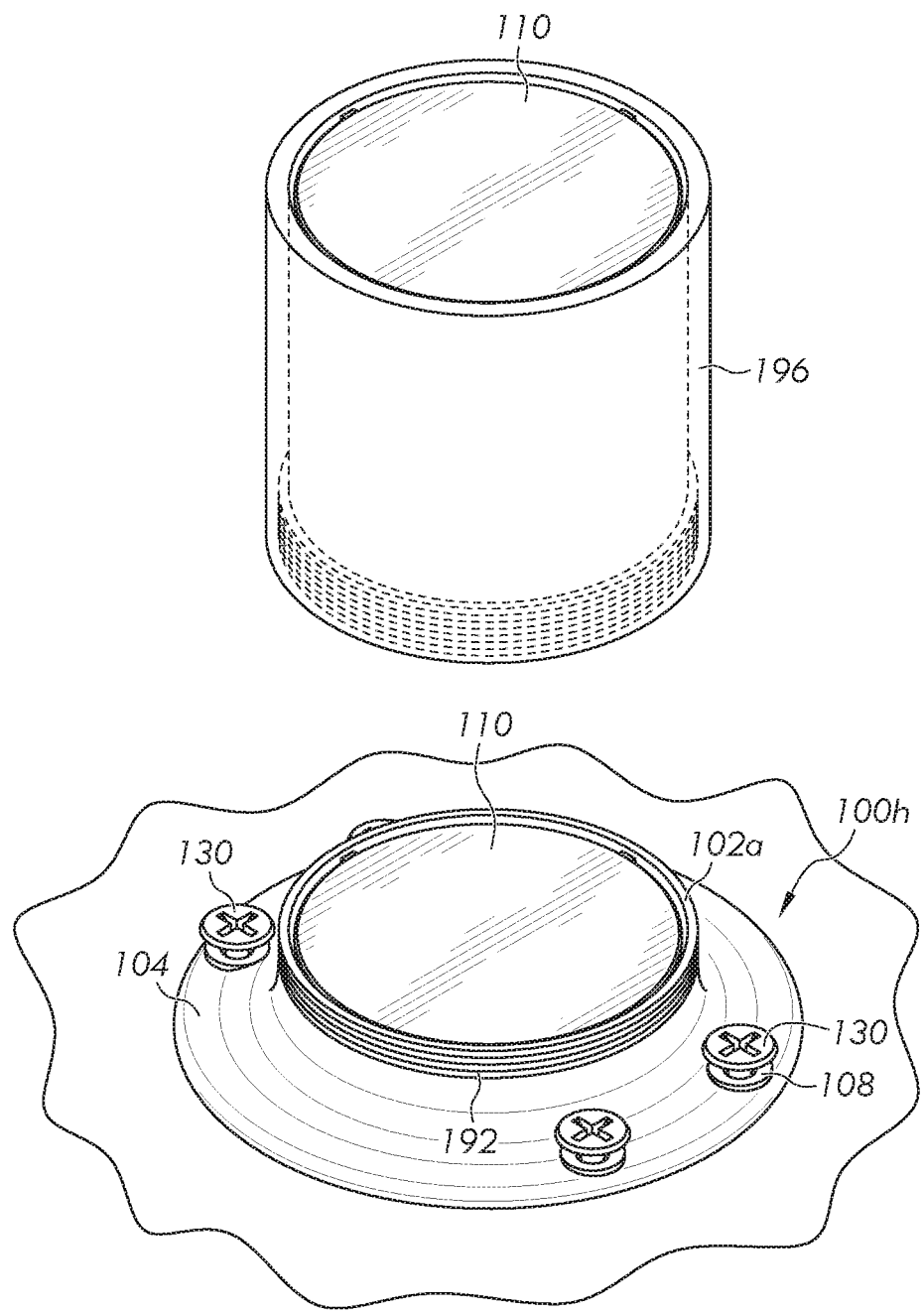
FIG. 7 illustrates a hole protector with a cylinder extension.

FIG. 7 illustrates an extension cylinder 196 with a punch-out cap 110. Protector 100h has a punch-out cap, just like the base model protector 100. Threads 192 allow installation of extension cylinder 196, similar to cylinder 194. Cylinder 196 raises the height of protector 100h and includes a separate punch out cap so that the top of the overall protector assembly still remains closed. A contractor can add or remove different heights of extension cylinders as needed to customize the height of a protector. When the contractor is ready to run the MPE, both caps 110 are punched out or cylinder 196 is removed and only the bottom cap 110 is punched out. In an alternative embodiment, cylinder 196 does not include a punch-out cap 110 and instead is fully enclosed without a cap of any sort.

Figure 8:
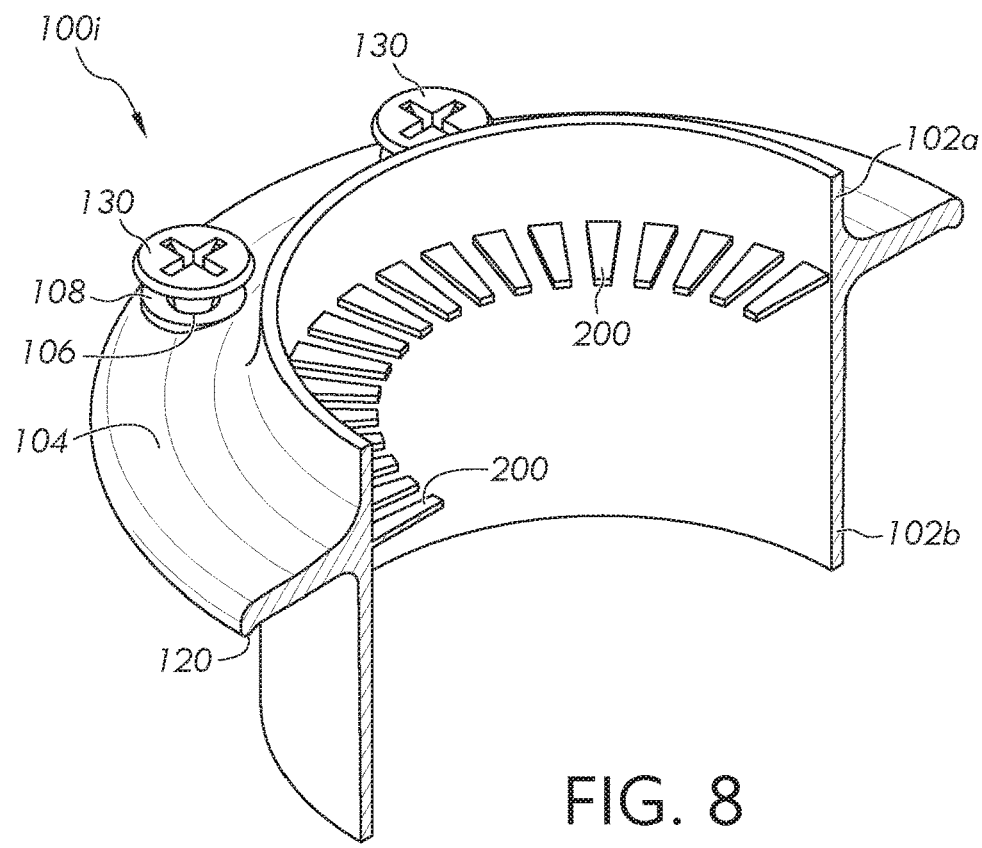
FIG. 8 illustrates a hole protector with internal fingers.

FIG. 8 illustrates a protector 100i with a ring of fingers 200 extending into the middle of cylinder 102. Fingers 200 are flexed when an MPE is inserted through cylinder 102 and apply a force to center the MPE. Fingers 200 also help contain fire retardant caulking or other material when used. When a protector 100 is used horizontally, as shown in FIGS. 5a-5d, fingers 200 also help support the MPE within the protector, rather than just letting the MPE sit on the inner diameter of cylinder 102.

Figure 9:
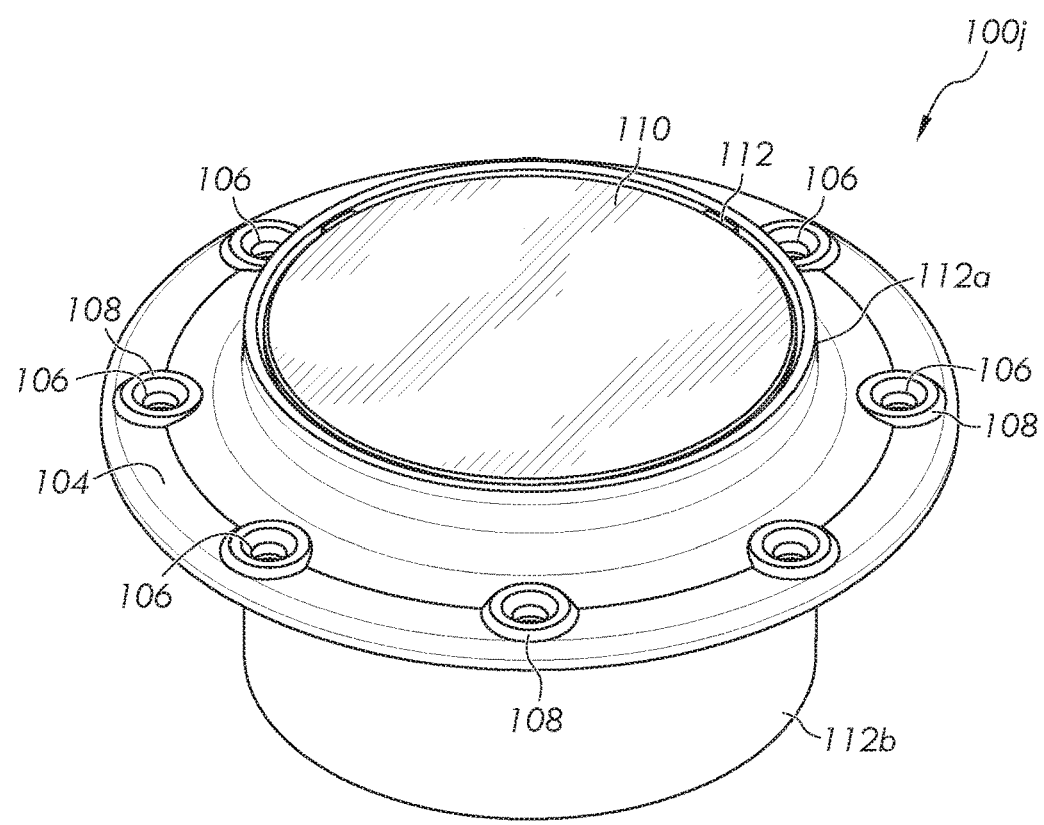
FIG. 9 illustrates a hole protector with an alternative screw hole configuration.

FIG. 9 illustrates a protector 100j with an alternative screw hole 106 configuration. Protector 100j includes eight equally spaced screw holes 106 rather than 4 screw holes as in the previous embodiments. With eight screw holes, protector 100j can be screwed on to a sheet with four equally spaced screws, as shown in FIG. 3a, or closer screw holes can be used to screw the protector onto two parallel beams as shown in FIG. 5a.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of building construction, comprising:
   providing a subfloor;
   forming a hole in the subfloor;
   providing a hole protector including,
      a cylinder,
      a skirt disposed around the cylinder, and
      a cap disposed on the cylinder;
   disposing the hole protector over the subfloor after forming the hole in the subfloor, wherein the cylinder extends into the hole;
   fastening the hole protector to the subfloor;
   forming a wall frame over the hole protector and within a height of the cylinder;
   removing the cap of the hole protector; and
   disposing an MPE through the cylinder.

2. The method of claim 1, further including disposing a fire-retardant material between the MPE and cylinder.

3. The method of claim 1, further including forming the wall frame by disposing a piece of lumber on the subfloor adjacent to the hole protector, wherein a height of the cylinder above the subfloor greater than a height of the piece of lumber above the subfloor.

4. The method of claim 3, further including disposing the piece of lumber directly on the subfloor.

5. The method of claim 4, wherein the subfloor and wall frame are both formed from wood.

6. A method of building construction, comprising:
   providing a subfloor;
   forming a hole in the subfloor; and
   disposing a hole protector over the hole, wherein the hole protector includes a first cylinder, a skirt, and a cap formed from a continuous piece of plastic material forming a wall frame over the subfloor and within a height of the hole protector after disposing the hole protector over the hole.

7. The method of claim 6, further including attaching the hole protector to the subfloor using a fastener.

8. The method of claim 6, further including removing the cap of the hole protector after forming the wall frame.

9. The method of claim 8, further including removing the cap by breaking a tab between the first cylinder and the cap, wherein the tab is formed from the continuous piece of plastic material.

10. The method of claim 6, wherein the hole protector includes an internal ridge formed around an internal diameter of the first cylinder.

11. The method of claim 10, further including:
   removing the cap from the hole protector
   disposing a clamp around an MPE;
   disposing the MPE through the hole protector after removing the removable portion, wherein the clamp sits on the internal ridge; and
   disposing a fire-retardant material between the hole protector and the MPE, wherein the fire-retardant material fills a gap between the MPE and first cylinder above the clamp and internal ridge, and wherein the clamp and internal ridge slow the flow of fire-retardant material through the first cylinder.

12. The method of claim 6, further including selecting a size of the hole protector based on a size of the hole.

13. The method of claim 6, further including attaching an extension to the first cylinder, wherein the extension includes a second cylinder and a second cap.

14. A method of building construction, comprising:
   providing a first hole protector comprising,
      a cylinder,
      a skirt disposed around the cylinder,
      a cap disposed within the cylinder with a gap between the cap and cylinder, and
      a tab extending from the cylinder to the cap across the gap to hold the cap within the cylinder;
   attaching the first hole protector to a substrate;
   removing the cap by breaking the tab; and
   disposing an MPE through the cylinder.

15. The method of claim 14, further including forming a wall frame over the substrate, wherein a portion of the wall frame extends to within a height of the cylinder.

16. The method of claim 15, wherein the wall frame includes:
   a first lower plate disposed completely within a height of the cylinder; and
   a second lower plate disposed on the first lower plate and only partially within a height of the cylinder.

17. The method of claim 15, wherein the skirt and wall frame are both disposed directly on a top surface of the substrate.

18. The method of claim 14, further including disposing a second hole protector over the substrate opposite the first hole protector.

19. The method of claim 14, further including forming the cylinder, skirt, cap, and tab from a single continuous piece of plastic material.

20. The method of claim 19, further including an internal ridge formed within the cylinder, wherein the ridge is formed using the single continuous piece of plastic material.

* * * * *

UNITED STATES PATENT AND TRADEMARK OFFICE
CERTIFICATE OF CORRECTION

| | | |
|---|---|---|
| PATENT NO. | : 10,865,572 B2 | Page 1 of 1 |
| APPLICATION NO. | : 16/428391 | |
| DATED | : December 15, 2020 | |
| INVENTOR(S) | : Manuel Altero-Marquez et al. | |

It is certified that error appears in the above-identified patent and that said Letters Patent is hereby corrected as shown below:

In the Claims

Column 9, Claim 6, Line 47, delete the word "and".

Column 9, Claim 6, Line 50, after the word "material", insert -- ; and --.

Column 10, Claim 11, Line 9, after the word "protector", insert -- ; --.

Column 10, Claim 11, Line 12, after the words "removing the", insert the word -- cap -- and delete the words "removable portion".

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*